(12) United States Patent
Hiratani et al.

(10) Patent No.: US 12,441,227 B2
(45) Date of Patent: Oct. 14, 2025

(54) IN-VEHICLE CARGO HANDLING SYSTEM, STACKER, AND METHOD OF DELIVERING CARGO

(71) Applicant: TOYOTA JIDOSHA KABUSHIKI KAISHA, Toyota (JP)

(72) Inventors: Toshihiko Hiratani, Toyota (JP); Naoyuki Taguri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 351 days.

(21) Appl. No.: 18/140,159

(22) Filed: Apr. 27, 2023

(65) Prior Publication Data
US 2023/0348184 A1    Nov. 2, 2023

(30) Foreign Application Priority Data
May 2, 2022 (JP) ................................. 2022-076273

(51) Int. Cl.
*B60P 3/00* (2006.01)
*B60P 1/54* (2006.01)
*B65G 67/02* (2006.01)

(52) U.S. Cl.
CPC ............. *B60P 3/007* (2013.01); *B60P 1/5433* (2013.01); *B65G 67/02* (2013.01)

(58) Field of Classification Search
CPC ....................................................... B60P 3/007
USPC ....................................................... 414/679
See application file for complete search history.

(56) References Cited

U.S. PATENT DOCUMENTS

| | | | |
|---|---|---|---|
| 10,059,451 B2* | 8/2018 | High | B64D 1/22 |
| 11,119,487 B2* | 9/2021 | Jarvis | G01C 21/20 |
| 11,447,055 B2* | 9/2022 | Kanitz | G06Q 10/083 |
| 11,560,079 B2* | 1/2023 | Lundeen | B60P 1/38 |
| 12,129,115 B2* | 10/2024 | Iwamoto | B60P 3/007 |
| 2017/0291766 A1 | 10/2017 | Orth et al. | |
| 2019/0220000 A1 | 7/2019 | Ibe | |
| 2021/0284450 A1 | 9/2021 | Wang et al. | |
| 2021/0387808 A1* | 12/2021 | Kalouche | B60P 3/007 |
| 2022/0097591 A1 | 3/2022 | Kiyokami | |
| 2022/0097970 A1 | 3/2022 | Kiyokami | |
| 2022/0396192 A1* | 12/2022 | Paul | B66F 9/063 |

FOREIGN PATENT DOCUMENTS

| | | | |
|---|---|---|---|
| CN | 110937294 A | 3/2020 | |
| CN | 112093347 A | 12/2020 | |
| DE | 102016106456 A1 | 10/2017 | |
| DE | 102018211567 A1 | 1/2020 | |
| JP | 55123814 A * | 9/1980 | ............. 414/679 |

(Continued)

*Primary Examiner* — James Keenan
(74) *Attorney, Agent, or Firm* — Dinsmore & Shohl LLP

(57) ABSTRACT

An in-vehicle cargo handling system includes a storage conveyor configured to circularly convey a cargo along a one-stroke conveyance route, and a stacker fixedly installed in a vehicle and configured to rotate the cargo at least around an axis parallel to a vehicle vertical direction, the stacker transferring the cargo between a first transfer position provided in the middle of the conveyance route and a second transfer position separated from the first transfer position in a horizontal direction, in which the stacker allows the cargo to be transferred to and from the storage conveyor at the first transfer position.

7 Claims, 21 Drawing Sheets

(56) References Cited

FOREIGN PATENT DOCUMENTS

| JP | 60031405 A | * | 2/1985 | ............. B65G 1/133 |
| JP | 2011-230887 A | | 11/2011 | |
| JP | 2017-200846 A | | 11/2017 | |
| JP | 2020-090151 A | | 6/2020 | |
| JP | 2022-500333 A | | 1/2022 | |
| JP | 2022-056156 A | | 4/2022 | |

* cited by examiner

IN-VEHICLE CARGO HANDLING SYSTEM, STACKER, AND METHOD OF DELIVERING CARGO

CROSS REFERENCE TO RELATED APPLICATION

This application claims priority to Japanese Patent Application No. 2022-076273 filed on May 2, 2022, which is incorporated herein by reference in its entirety including the specification, claims, drawings, and abstract.

TECHNICAL FIELD

The present specification discloses an in-vehicle cargo handling system configured to handle the inside of a vehicle as a storage place of a cargo and to load and unload the cargo, a stacker used in the in-vehicle cargo handling system, and a method of delivering the cargo.

BACKGROUND

In the related art, a vehicle such as a truck has been used for cargo delivery. A cargo to be delivered is stored in such a vehicle. In order to efficiently deliver a cargo, mounting a cargo handling system on a vehicle has been proposed, the cargo handling system automatically performing at least one of an unloading work of taking out the cargo from the vehicle and a loading work of loading the cargo into the vehicle.

For example, JP 2020-090151 A discloses a vehicle including a rack on which a cargo is placed, a conveyor provided below the rack, a stacker crane that moves the cargo on the rack upward, downward, forward, and rearward to move the cargo to the conveyor, and a robot arm that delivers the cargo on the conveyor to a traveling robot. According to the above-described technique, since the cargo on the rack is automatically taken out and delivered to the traveling robot, it is possible to perform efficient delivery to some extent.

Here, the above-described in-vehicle cargo handling system in the related art uses a mobile stacker that moves in the vehicle in order to take out a cargo from a shelf or load a cargo onto a shelf. For example, in JP 2020-090151 A described above, the stacker crane that moves upward, downward, forward, and rearward is used to load and unload a cargo.

When such a mobile stacker is used, there is a problem in that utilization efficiency of a space in the vehicle is reduced. That is, when the mobile stacker is used, it is naturally necessary to secure a movement space of the mobile stacker in the vehicle. Then, a cargo cannot be stored in this movement space. It is wasteful to secure such a movement space in a vehicle having a limited space therein, and utilization efficiency of a space in the vehicle is significantly reduced.

Therefore, the present specification discloses an in-vehicle cargo handling system capable of further improving utilization efficiency of a space in a vehicle, a stacker used in the in-vehicle cargo handling system, and a method of delivering a cargo.

SUMMARY

An in-vehicle cargo handling system disclosed in the present specification includes a storage conveyor configured to circularly convey a cargo along a one-stroke conveyance route, and a stacker fixedly installed in a vehicle and configured to rotate the cargo at least around an axis parallel to a vehicle vertical direction, the stacker transferring the cargo between a first transfer position provided in the middle of the conveyance route and a second transfer position separated from the first transfer position in a horizontal direction, in which the stacker allows the cargo to be transferred to and from the storage conveyor at the first transfer position.

In such a configuration, since the storage conveyor circularly conveys the cargo, the cargo at any position in the storage conveyor can be conveyed to the first transfer position, and the cargo received at the first transfer position can be conveyed to any position in the storage conveyor. In this case, the stacker only needs to be able to access the first transfer position in order to allow the cargo to be transferred to and from the storage conveyor. In other words, according to the above configuration, the storage conveyor does not need to move in the vehicle, and can be fixedly installed in the vehicle. Therefore, it is not necessary to secure a movement space of the storage conveyor in the vehicle, thereby making it possible to secure a large storage space of the cargo. As a result, according to the above configuration, utilization efficiency of the space in the vehicle can be improved.

In this case, the stacker may include a main column formed to extend in the vehicle vertical direction, a hand configured to support the cargo and to be able to move the cargo forward and rearward in the horizontal direction, a lifting-and-lowering mechanism configured to be able to lift and lower the hand along the main column, and a rotation mechanism configured to be able to rotate the hand together with the main column.

According to the above configuration, the cargo supported by the hand can be rotated, moved upward and downward, horizontally moved forward and rearward, and as such, the cargo can be moved with a high degree of freedom.

Further, the stacker may further include a base fixed to a floor surface of the vehicle; the rotation mechanism may include a rotary table attached to the base so as to be rotatable around the axis parallel to the vehicle vertical direction, the rotary table having the main column fixed thereto, and a rotary motor fixed to a vicinity of the base and configured to rotate the rotary table by being driven; and the lifting-and-lowering mechanism may include a lifting-and-lowering motor disposed inside the base and fixed to the rotary table, and a belt stretched along the main column and configured to circularly move as the lifting-and-lowering motor is driven, the belt having the hand attached thereto.

According to the above configuration, both the large rotary motor and the lifting-and-lowering motor configured to lift, lower, and rotate the hand can be disposed near the bottom portion of the vehicle. As a result, the center of gravity of the stacker can be lowered, thereby improving stability of the stacker.

Furthermore, the in-vehicle cargo handling system may further include an unmanned ground vehicle configured to receive the cargo from the stacker at the second transfer position, the unmanned ground vehicle may include a container configured to accommodate the cargo, and a ramp provided in the container and inclined rearward and downward in a forward-and-rearward direction of the unmanned ground vehicle, the ramp allowing the cargo to slide into the container, the hand may include a fork plate on which the cargo is placed, the fork plate moving forward and rearward in the horizontal direction and having one or more notches formed at a tip thereof, and, when the cargo is delivered from the stacker to the unmanned ground vehicle, the stacker may cause the notch of the fork plate to be positioned on the ramp in a state where the cargo is placed on the fork plate, then may lower the fork plate to bring a top portion of the ramp into contact with a bottom surface of the cargo, and then may cause the fork plate to retreat to a retreating side in the horizontal direction, thereby allowing the cargo to slide down along the ramp.

According to the above configuration, it is possible to smoothly deliver the cargo from the stacker to the unmanned ground vehicle without providing a complicated mechanism such as a hand or a lifter in the unmanned ground vehicle.

In this case, frictional force between the top portion of the ramp and the bottom surface of the cargo may be higher than frictional force between the fork plate and the bottom surface of the cargo.

According to the above configuration, when the fork plate retreats to the retreating side in the horizontal direction, it is possible to prevent the cargo from retreating together with the fork plate, and as such, it is possible to smoothly deliver the cargo to the unmanned ground vehicle.

Further, the fork plate may have a protrusion formed to protrude upward and provided at the tip thereof, and when placing the cargo on the fork plate, the stacker may cause a part of the cargo to protrude from the tip of the fork plate and may place the cargo on the protrusion.

According to the above configuration, it is possible to make the level of the cargo substantially horizontal when the cargo is lifted at the top portion.

Further, the in-vehicle cargo handling system may further include a roof opening formed on a ceiling of the vehicle and configured to allow the cargo to pass therethrough, and a relay apparatus configured to transport the cargo received from one of a drone landing on the ceiling and the stacker through the roof opening and to deliver the cargo to the other of the drone and the stacker.

By providing such a relay apparatus, the height of the stacker can be reduced, and stability of the stacker can be further improved.

The present specification provides a stacker configured to transfer a cargo in a vehicle between a first transfer position and a second transfer position, the stacker including a main column formed to extend in a vehicle vertical direction, a hand configured to support the cargo and to be able to move the cargo forward and rearward in a horizontal direction, a lifting-and-lowering mechanism configured to be able to lift and lower the hand along the main column, a rotation mechanism configured to be able to rotate the hand together with the main column around an axis parallel to the vehicle vertical direction, and a base fixed to a floor surface of the vehicle, in which the rotation mechanism includes a rotary table attached to the base so as to be rotatable around the axis parallel to the vehicle vertical direction, the rotary table having the main column fixed thereto, and a rotary motor fixed to a vicinity of the base and configured to rotate the rotary table by being driven, and the lifting-and-lowering mechanism includes a lifting-and-lowering motor disposed inside the base and fixed to the rotary table, and a belt stretched along the main column and configured to circularly move as the lifting-and-lowering motor is driven, the belt having the hand attached thereto.

According to the above configuration, the cargo supported by the hand can be rotated, moved upward and downward, horizontally moved forward and rearward, and as such, the cargo can be moved with a high degree of freedom. Further, both the large rotary motor and the lifting-and-lowering motor configured to lift, lower, and rotate the hand can be disposed near the bottom portion of the vehicle. As a result, the center of gravity of the stacker can be lowered, thereby improving stability of the stacker.

A method of delivering a cargo disclosed in the present specification is a method of delivering the cargo from a stacker fixedly installed in a vehicle to an unmanned ground vehicle entering the vehicle, in which the stacker includes a fork plate on which the cargo is placed, the fork plate moving forward and rearward in a horizontal direction and having one or more notches formed at a tip thereof, the unmanned ground vehicle includes a container configured to accommodate the cargo, and a ramp provided in the container and inclined rearward and downward in a forward-and-rearward direction of the unmanned ground vehicle, the ramp allowing the cargo to slide into the container, and the stacker causes the notch of the fork plate to be positioned on the ramp in a state where the cargo is placed on the fork plate, then lowers the fork plate to bring a top portion of the ramp into contact with a bottom surface of the cargo, and then causes the fork plate to retreat to a retreating side in the horizontal direction, thereby allowing the cargo to slide down along the ramp.

According to the above configuration, it is possible to smoothly deliver the cargo from the stacker to the unmanned ground vehicle without providing a complicated mechanism such as a hand or a lifter in the unmanned ground vehicle.

According to the technique disclosed in the present specification, utilization efficiency of a space in a vehicle can be further improved.

DESCRIPTION OF EMBODIMENTS

Figure 1:
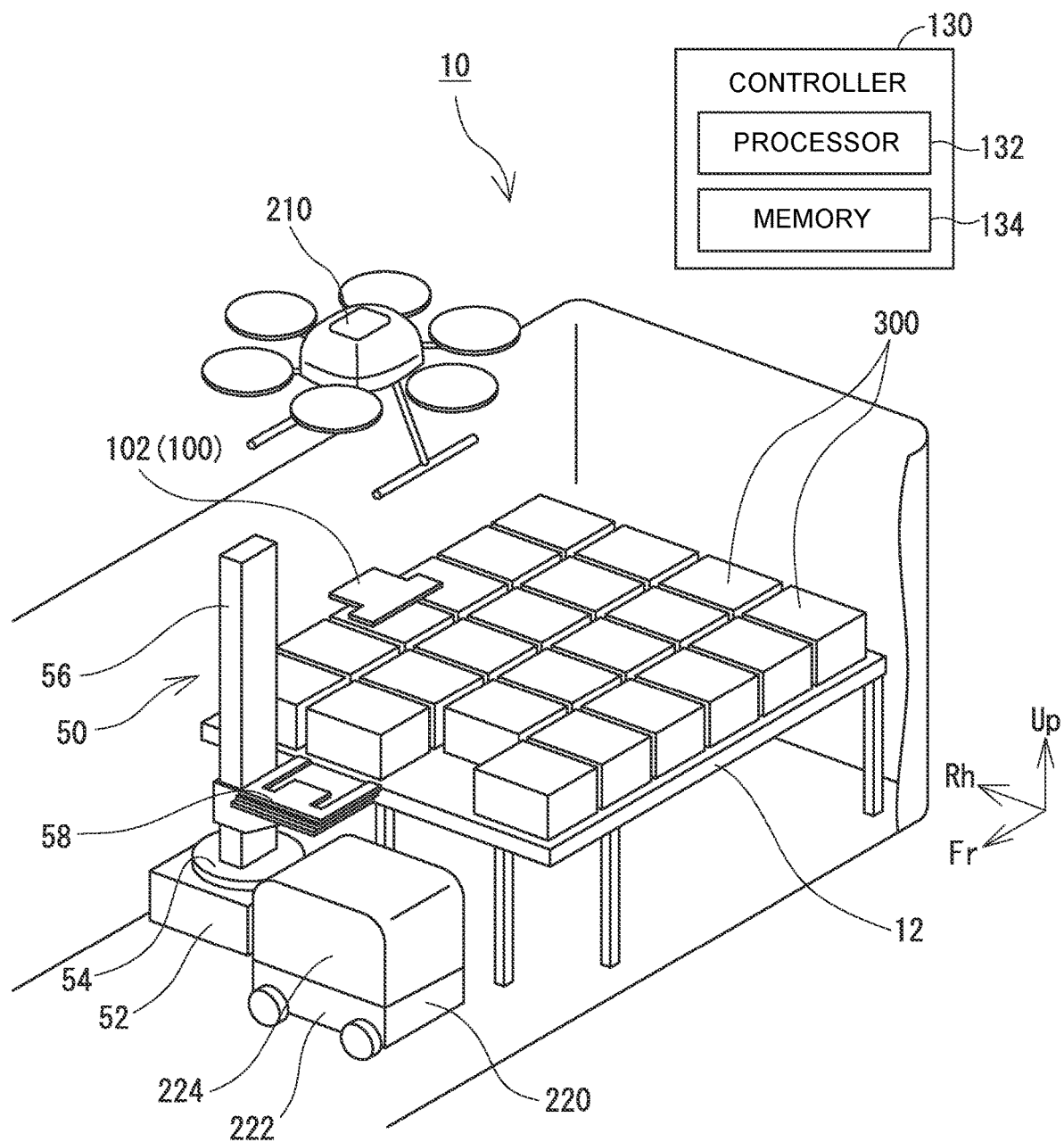
FIG. 1 is a schematic perspective view of a cargo handling system.
Figure 2:
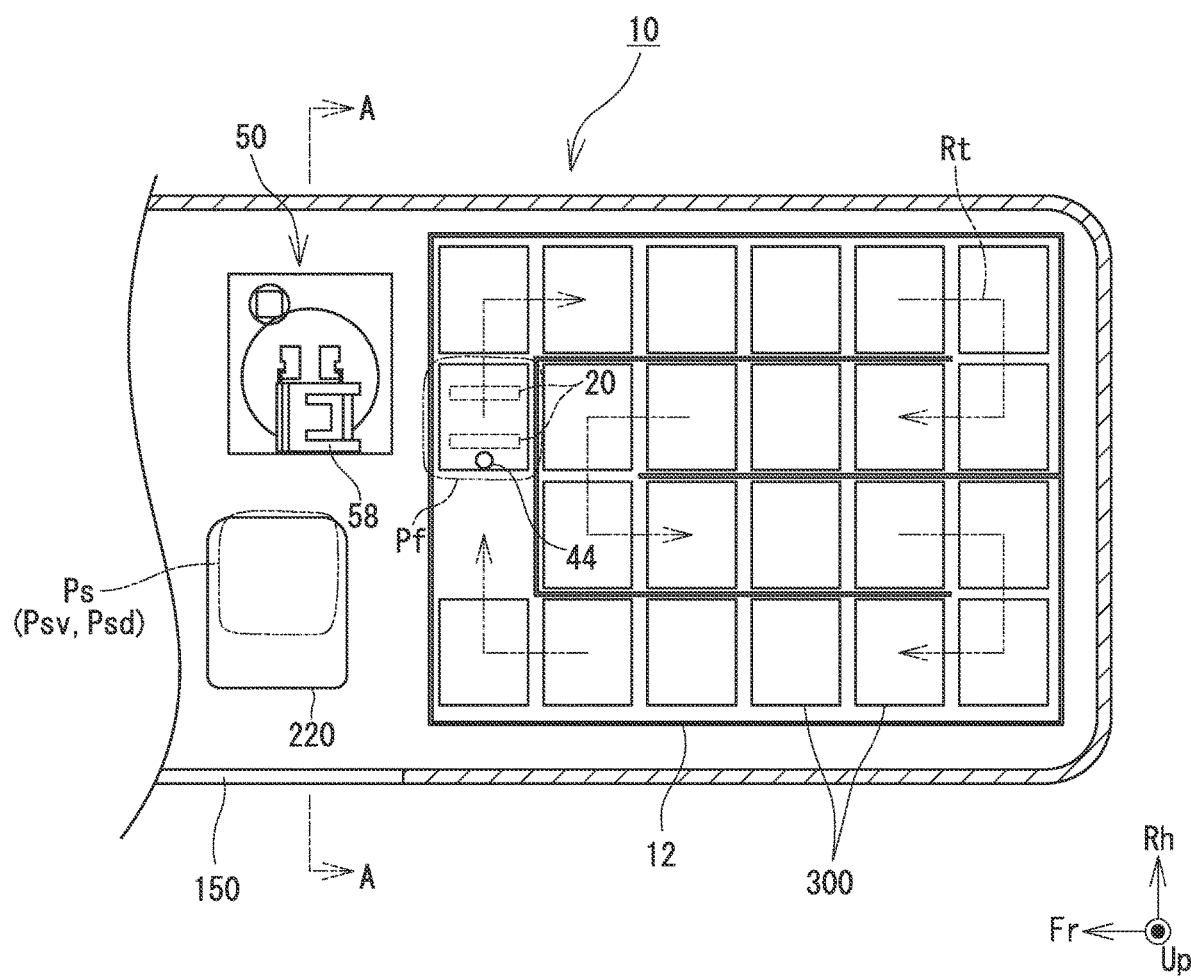
FIG. 2 is a plan view of the cargo handling system.
Figure 3:
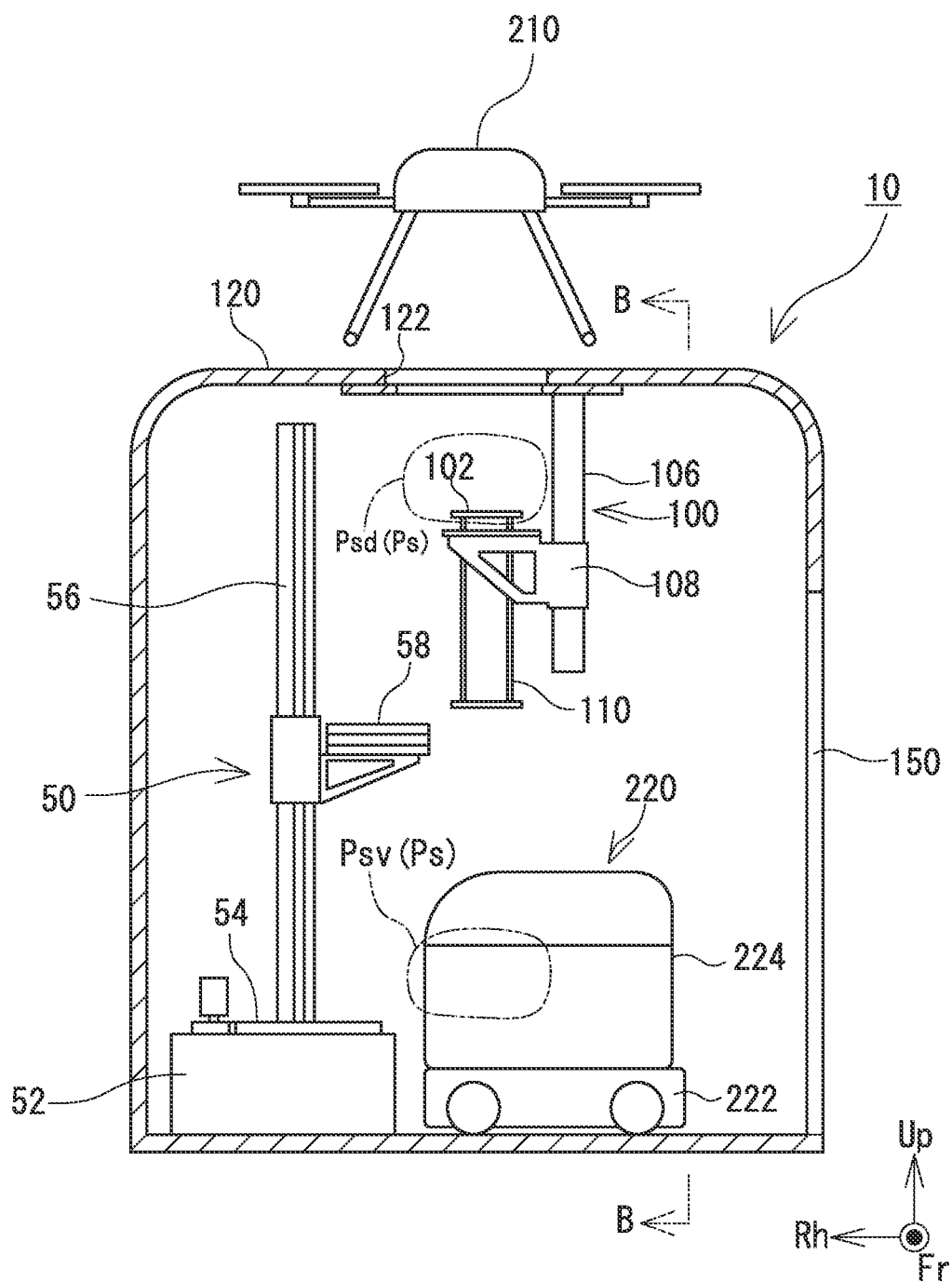
FIG. 3 is a partial cross-sectional view taken along line A-A in FIG. 2.
Figure 4:
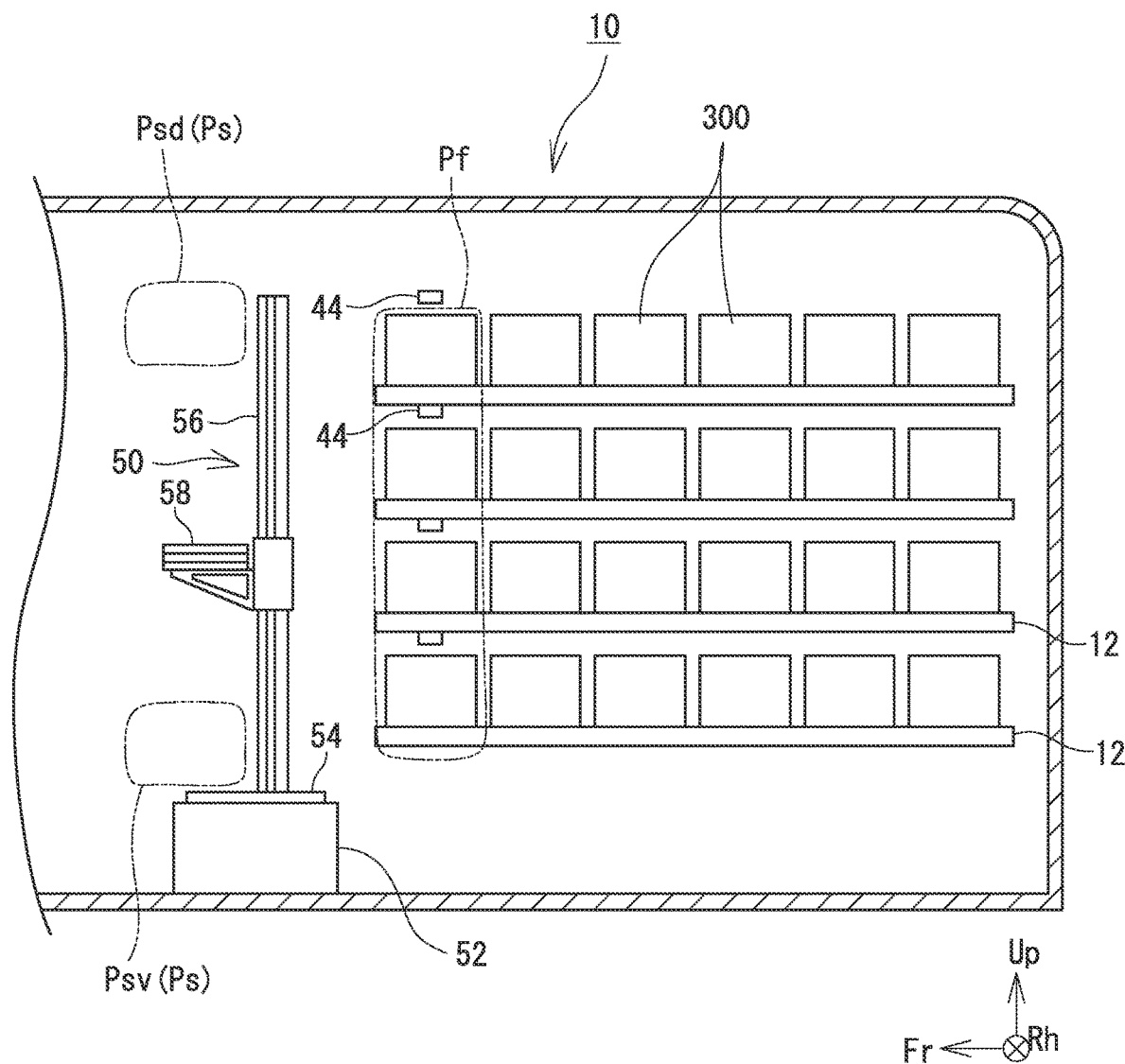
FIG. 4 is a partial cross-sectional view taken along line B-B in FIG. 3.

Hereinafter, a configuration of a cargo handling system 10 will be described with reference to the drawings. FIG. 1 is a schematic perspective view of the cargo handling system 10, and FIG. 2 is a plan view of the cargo handling system 10. FIG. 3 is a partial cross-sectional view taken along line A-A in FIG. 2, and FIG. 4 is a partial cross-sectional view taken along line B-B in FIG. 3. In the following drawings, "Fr," "Up," and "Rh" indicate the front side, the upper side, and the right side of a vehicle, respectively.

The cargo handling system 10 of this example is mounted on a vehicle. This vehicle transports a cargo 300 in cooperation with an unmanned carrier. The unmanned carrier encompasses, for example, an unmanned ground vehicle (hereinafter referred to as "UGV") 220 that travels on the ground and transports the cargo 300, and a drone 210 that flies and transports the cargo 300. It is noted that, hereinafter, in a case where the UGV 220 and the drone 210 are not distinguished, they are referred to as an "unmanned carrier." Usually, such an unmanned carrier is smaller than a vehicle, and thus can enter the premises of an individual's house or indoors, and is excellent in mobility. On the other hand, the unmanned carrier has a shorter cruising distance than that of the vehicle. Therefore, the unmanned carrier is responsible only for transportation from the vicinity of a delivery destination to the delivery destination. A vehicle transports the cargo 300 from a departure position to the vicinity of a delivery destination.

The cargo handling system 10 stores the cargo 300 in a vehicle, picks up the cargo 300 requested from the unmanned carrier, and delivers the cargo 300 to the unmanned carrier. That is, the delivery of the cargo 300 from the vehicle to the unmanned carrier is automatically performed by the cargo handling system 10 without manual operation. Hereinafter, a description will be mainly given as to a case where the cargo 300 is delivered from the cargo handling system 10 to the unmanned carrier, but the cargo 300 may be delivered from the unmanned carrier to the vehicle. That is, after receiving the cargo 300 from a shipper, the unmanned carrier may move to a vehicle and deliver the cargo 300 to the cargo handling system 10.

Overall Configuration of Cargo Handling System

Next, an overall configuration of the cargo handling system 10 will be briefly described. As described above, the cargo handling system 10 is mounted on a vehicle. No particular limitation is imposed on the configuration of the vehicle on which the cargo handling system 10 is mounted, but a box-type or truck-type vehicle capable of loading a large number of cargos 300 is usually selected. The vehicle of the present example is a box type in which the back surface rises almost vertically. A door opening 150 (refer to FIGS. 2 and 3) used when an operator or the UGV 220 enters or exits the vehicle is formed on the side surface of the vehicle. When the UGV 220 enters or exits the vehicle, a ramp (not illustrated) is extended from the lower end of the door opening 150 toward the road surface. In addition, a back door opening (not illustrated) used to load the cargo 300 is formed on the back surface of the vehicle.

The cargo handling system 10 includes a storage conveyor 12 (not illustrated in FIG. 3) that stores the plurality of cargos 300, a stacker 50 that receives the cargo 300 from the storage conveyor 12 and delivers the cargo 300 to the unmanned carrier, a relay apparatus 100 (only a lifting-and-lowering plate 102 of the relay apparatus 100 is illustrated in FIG. 1, and the same is not illustrated in FIGS. 2 and 4) that relays between the stacker 50 and the drone 210, and a controller 130 that manages operations of these components.

The storage conveyor 12 is disposed at a rear portion of the vehicle, and has a horizontal upper surface on which the plurality of cargos 300 can be placed. In this example, as illustrated in FIG. 4, a plurality of (four in the illustrated example) storage conveyors 12 are stacked and disposed in the vertical direction. In FIG. 1, the storage conveyors 12 in the second and subsequent stages are not illustrated, in order to easily view the configuration of the other members. The plurality of cargos 300 are placed on each storage conveyor 12. Therefore, each of the plurality of storage conveyors 12 functions as a shelf that stores a large number of cargos 300.

The storage conveyor 12 circularly conveys the cargo 300 along a one-stroke conveyance route Rt (refer to FIG. 2). As is clear from FIG. 2, the conveyance route Rt has a one-stroke shape in which the conveyance route Rt is turned back, in a zigzag manner, an odd number of times (three times in the present example) so that a route traveling toward the rear of the vehicle and a route traveling toward the front of the vehicle are alternately repeated, and then the conveyance route Rt travels in the vehicle width direction and returns to a departure point.

A first transfer position Pf (refer to FIGS. 2 and 4) at which the cargo 300 is transferred to and from the stacker 50 is set at a position adjacent to the stacker 50 in the middle of the conveyance route Rt. When any cargo 300 is requested from the stacker 50, the storage conveyor 12 moves the requested cargo 300 to the first transfer position Pf along the conveyance route Rt. The first transfer position Pf is provided with a lifter 20 (refer to FIG. 2) configured to transfer the cargo 300. The target cargo 300 is delivered to the stacker 50 by the lifter 20.

The stacker 50 is a device that transfers the cargo 300 between the first transfer position Pf and a second transfer position Ps (refer to FIGS. 2 to 4). The second transfer position Ps is provided at a position separated from the first transfer position Pf in the horizontal direction, and is a position at which the cargo 300 is transferred between the stacker 50 and the unmanned carrier. In the present example, the unmanned carrier includes the UGV 220 entering the vehicle and the drone 210 landing on the ceiling of the vehicle. It is noted that illustration of the UGV 220 is omitted in FIG. 4, and illustration of the drone 210 is omitted in FIGS. 2 and 4.

The second transfer position Ps includes a UGV transfer position Psv at which the cargo 300 is transferred between the stacker 50 and the UGV 220, and a drone transfer position Psd at which the cargo 300 is transferred between the stacker 50 and the drone 210. Note that, in a case where the cargo 300 is delivered from the stacker 50 to the drone 210 or from the drone 210 to the stacker 50, the relay apparatus 100 is interposed therebetween. Therefore, the drone transfer position Psd is precisely a position at which the cargo 300 is transferred between the stacker 50 and the relay apparatus 100.

As illustrated in FIGS. 2 to 4, the UGV transfer position Psv is a position between the stacker 50 and the door opening 150, and is set at substantially the same height position as a container 224 of the UGV 220. The drone transfer position Psd is set in the vicinity of the ceiling of the vehicle interior and immediately above the UGV transfer position Psv. Therefore, the positions of the UGV transfer position Psv and the drone transfer position Psd in the horizontal direction substantially coincide with each other.

The stacker 50 is fixed at a position in the vehicle adjacent to the vehicle front side of the first transfer position Pf and adjacent to the right side in the vehicle width direction of the UGV transfer position Psv. The stacker 50 includes a hand 58 that holds the cargo 300. The hand 58 can move upward and downward in the vertical direction and can rotate in the horizontal plane. Further, the hand 58 can expand and contract in the horizontal direction. Then, the cargo 300 is transferred between the first transfer position Pf and the second transfer positions Psv and Psd by allowing the hand 58 to be lifted or lowered, to be rotated, and to expand or contract in a state where the cargo 300 is placed on the hand 58.

As illustrated in FIG. 3, the drone 210 lands on a roof 120 of the vehicle. A roof opening 122 configured to allow the cargo 300 to pass therethrough is formed in the roof 120. The relay apparatus 100 is provided immediately below the roof opening 122 and immediately above the UGV transfer position Psv. It is noted that illustration of the relay apparatus 100 is omitted in FIGS. 1, 2, and 4, in order to make other members easily viewable.

The relay apparatus 100 delivers the cargo 300 received from the stacker 50 to the drone 210, and delivers the cargo 300 received from the drone 210 to the stacker 50. More specifically, the relay apparatus 100 includes the lifting-and-lowering plate 102 configured to be movable inside and outside the vehicle through the roof opening 122. When the cargo 300 is delivered from the stacker 50 to the drone 210, the relay apparatus 100 moves the lifting-and-lowering plate 102 up to the upper side of the roof 120 in a state where the cargo 300 received from the stacker 50 is placed on the lifting-and-lowering plate 102. The drone 210 holds the cargo 300 placed on the lifting-and-lowering plate 102 with a hand mechanism (not illustrated) mounted on the drone 210. In a case where the cargo 300 is delivered from the drone 210 to the stacker 50, a procedure reverse to the above procedure is executed.

The controller 130 controls driving of the storage conveyor 12, the stacker 50, and the relay apparatus 100 described above. The controller 130 is physically a computer including a processor 132 and a memory 134. The "computer" also includes a microcontroller in which a computer system is incorporated into one integrated circuit. Furthermore, the processor 132 refers to a processor in a broad sense, and includes a general-purpose processor (for example, a CPU: Central Processing Unit, or the like) or a dedicated processor (for example, a GPU: Graphics Processing Unit, an ASIC: Application Specific Integrated Circuit, an FPGA: Field Programmable Gate Array, a PLD: Programmable Logic Device, or the like). Furthermore, the memory 134 may include at least one of a semiconductor memory (for example, a RAM, a ROM, a solid state drive, or the like) and a magnetic disk (for example, a hard disk drive or the like). In addition, the controller 130 does not need to be physically one element, and may be a combination of a plurality of computers existing at physically separated positions.

Flow of Cargo

Next, a brief description will be given as to a flow of delivering the specific cargo 300 stored on the storage conveyor 12 to the UGV 220 and the drone 210. The controller 130 determines the position of the target cargo 300 in the storage conveyor 12. When the target cargo 300 is not located at the first transfer position Pf, the storage conveyor 12 conveys the cargo 300 to the first transfer position Pf along the conveyance route Rt. Further, the stacker 50 moves the hand 58 up to the first transfer position Pf by allowing the hand 58 to be lifted or lowered, to be rotated, and to expand or contract. Thereafter, the cargo 300 conveyed up to the first transfer position Pf by the storage conveyor 12 is delivered to the hand 58 moved up to the first transfer position Pf. The procedure of this delivery will be described in detail later.

When the cargo 300 is placed on the hand 58 at the first transfer position Pf, the stacker 50 moves the hand 58 up to the UGV transfer position Psv or the drone transfer position Psd by allowing the hand 58 to be lifted or lowered, to be rotated, and to expand or contract.

When delivering the cargo 300 to the UGV 220, the stacker 50 moves the hand 58 up to the UGV transfer position Psv. Thereafter, the cargo 300 placed on the hand 58 is delivered to the container 224 of the UGV 220. The procedure of delivery to the UGV 220 will also be described in detail later.

When the cargo 300 is delivered to the drone 210, the stacker 50 moves the hand 58 to the drone transfer position Psd. In addition, the relay apparatus 100 moves the lifting-and-lowering plate 102 up to the drone transfer position Psd. When both the hand 58 and the lifting-and-lowering plate 102 reach the drone transfer position Psd, the cargo 300 is delivered from the hand 58 to the lifting-and-lowering plate 102. The procedure of delivering the cargo 300 here will also be described in detail later. When receiving the cargo 300, the relay apparatus 100 raises the lifting-and-lowering plate 102 and moves the same up to the upper side of the roof 120. The drone 210 receives the cargo 300 placed on the lifting-and-lowering plate 102 by the hand mechanism.

Here, in a general warehouse system, a cargo is stored on a fixed shelf, and when a specific cargo is taken out from the shelf, the stacker often moves in the warehouse to near the cargo. In the case of such a configuration, it is naturally necessary to secure a movement space for the stacker in the warehouse. This is not a major problem so long as the warehouse system is provided outside the vehicle and has a large site. However, since the space is limited in the vehicle, in a case where the movement space for the stacker is secured, the storage space for cargos is reduced accordingly, and the number of cargos that can be stored in the vehicle is reduced. This causes deterioration in transportation efficiency of a cargo.

On the other hand, as is clear from the above description, in the present example, while the cargo 300 is moved along the one-stroke conveyance route Rt in the storage conveyor 12, the stacker 50 itself is not moved in the vehicle. Therefore, it is not necessary to secure a movement space for the stacker 50. As a result, according to the present example, a large storage space for the cargo 300 can be secured, and transportation efficiency of the cargo 300 can be improved.

Next, configurations of the storage conveyor 12, the stacker 50, and the relay apparatus 100 will be described in detail.

Configuration of Storage Conveyor

Figure 5:
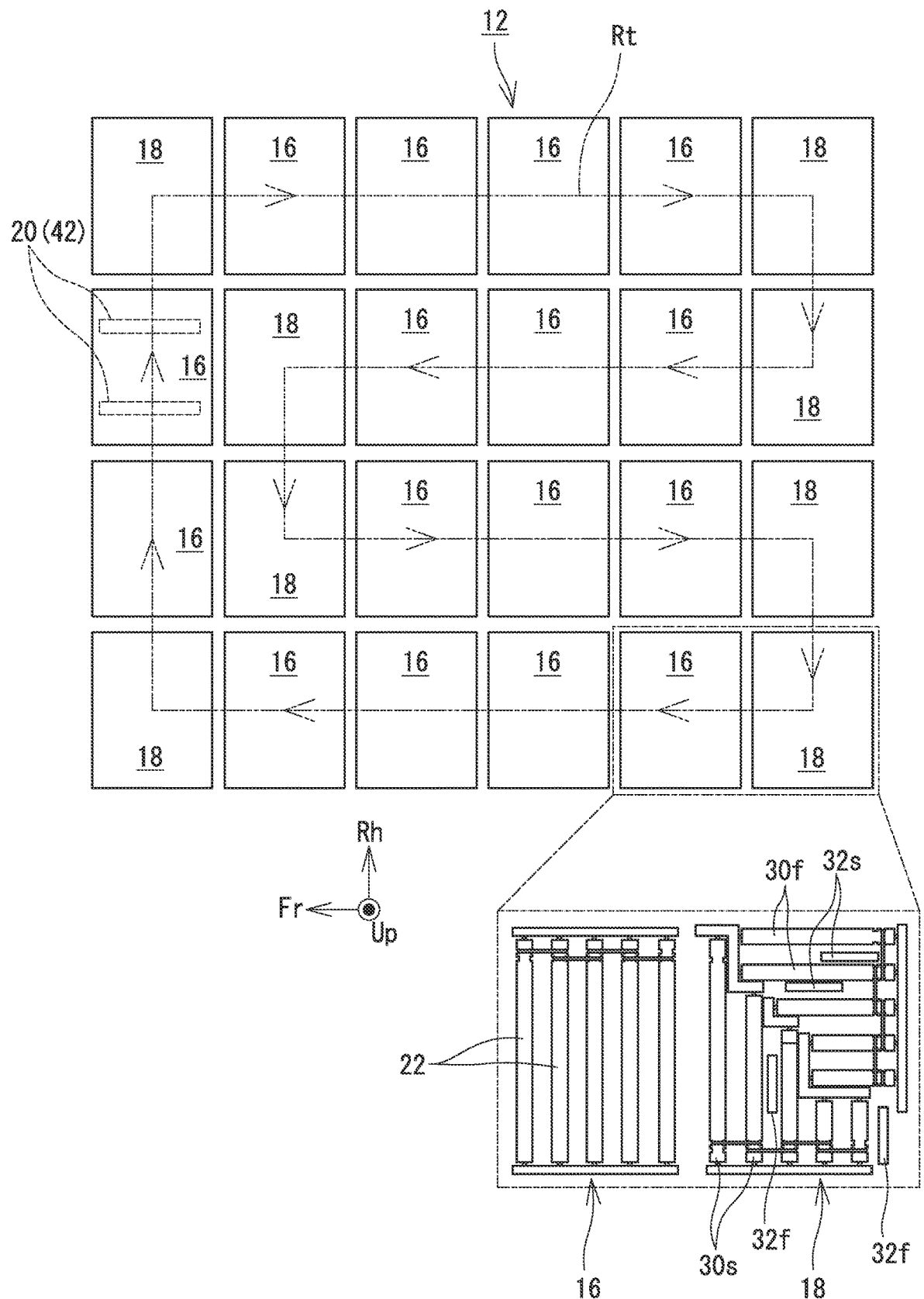
FIG. 5 is a schematic plan view of a storage conveyor.
Figure 21A:
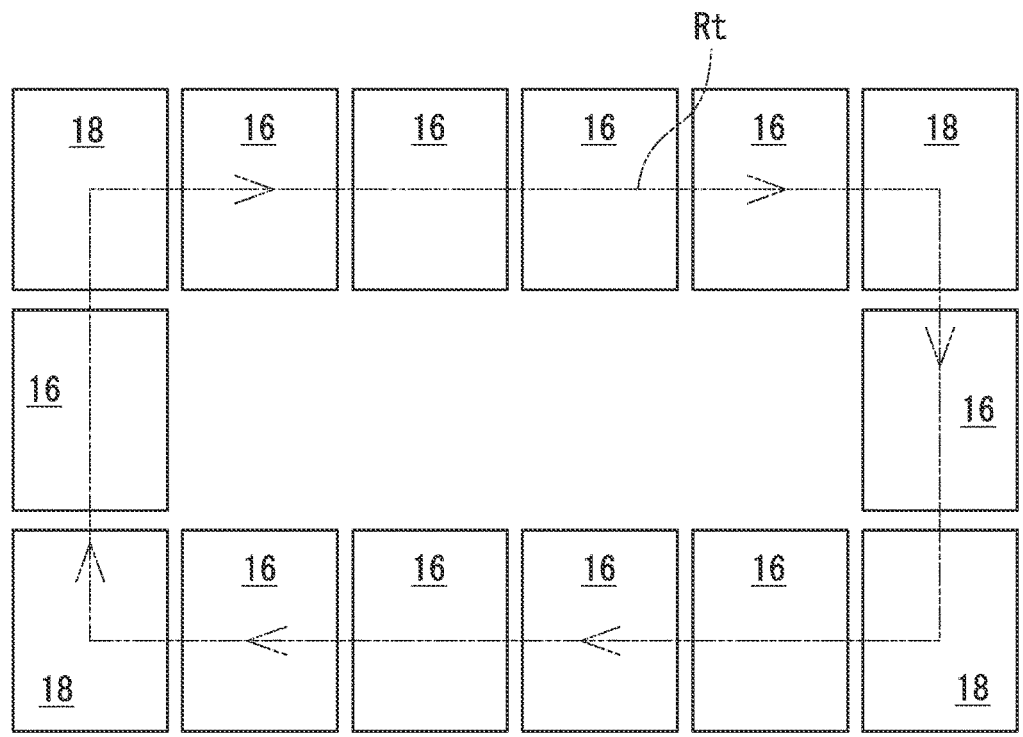
FIG. 21A is a view illustrating an example of a conveyance route.
Figure 21B:
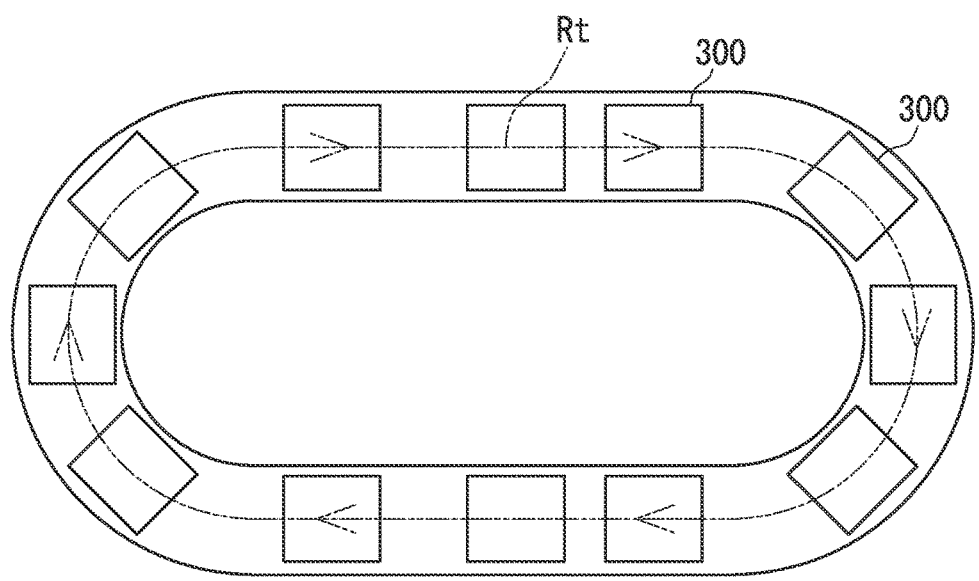
FIG. 21B is a view illustrating another example of the conveyance route.

First, the configuration of the storage conveyor 12 will be described in detail. FIG. 5 is a schematic plan view of the storage conveyor 12. As described above, the storage conveyor 12 circularly conveys the cargo 300 along the one-stroke conveyance route Rt. In the case of the present example, the conveyance route Rt is a one-stroke shape in which the conveyance route Rt is turned back, in a zigzag manner, an odd number of times (three times in the illustrated example) in the vehicle forward-and-rearward direction, and then the conveyance route Rt travels in the vehicle width direction and returns to a departure point. In the conveyance route Rt of this example, at each turn-back point, the direction is changed twice at a right angle so that the traveling direction is turned back in the opposite direction. By forming the conveyance route Rt into such a shape, it is possible to circularly convey the cargo while keeping the dead space small. However, the shape of the conveyance route Rt described here is an example, and other shapes may be formed so long as the cargo can be circularly conveyed. For example, the conveyance route Rt may have a substantially rectangular shape as illustrated in FIG. 21A, or may have a track shape as illustrated in FIG. 21B.

The storage conveyor 12 is configured by combining a plurality of conveyance units. As illustrated in FIG. 5, the conveyance unit includes a straight unit 16 that conveys the cargo 300 in a straight line, and a right angle turn unit 18 that conveys the cargo 300 while bending the traveling direction of the cargo 300 by 90 degrees. As described in detail later, each of the straight unit 16 and the right angle turn unit 18 includes a plurality of rollers, and a motor that drives the rollers. The upper surface of each of the straight unit 16 and the right angle turn unit 18 functions as a conveyance path on which the cargo 300 is conveyed. The straight unit 16 and the right angle turn unit 18 have outer shapes having substantially the same size. Therefore, the straight unit 16 and the right angle turn unit 18 can be arranged in a matrix shape without interfering with each other or leaving a large gap. By configuring the storage conveyor 12 using the straight unit 16 and the right angle turn unit 18, the size of the entire storage conveyor 12 and the conveyance route Rt can be easily changed by only changing the number of the conveyance units 16 and 18 and the arrangement thereof.

Figure 6:
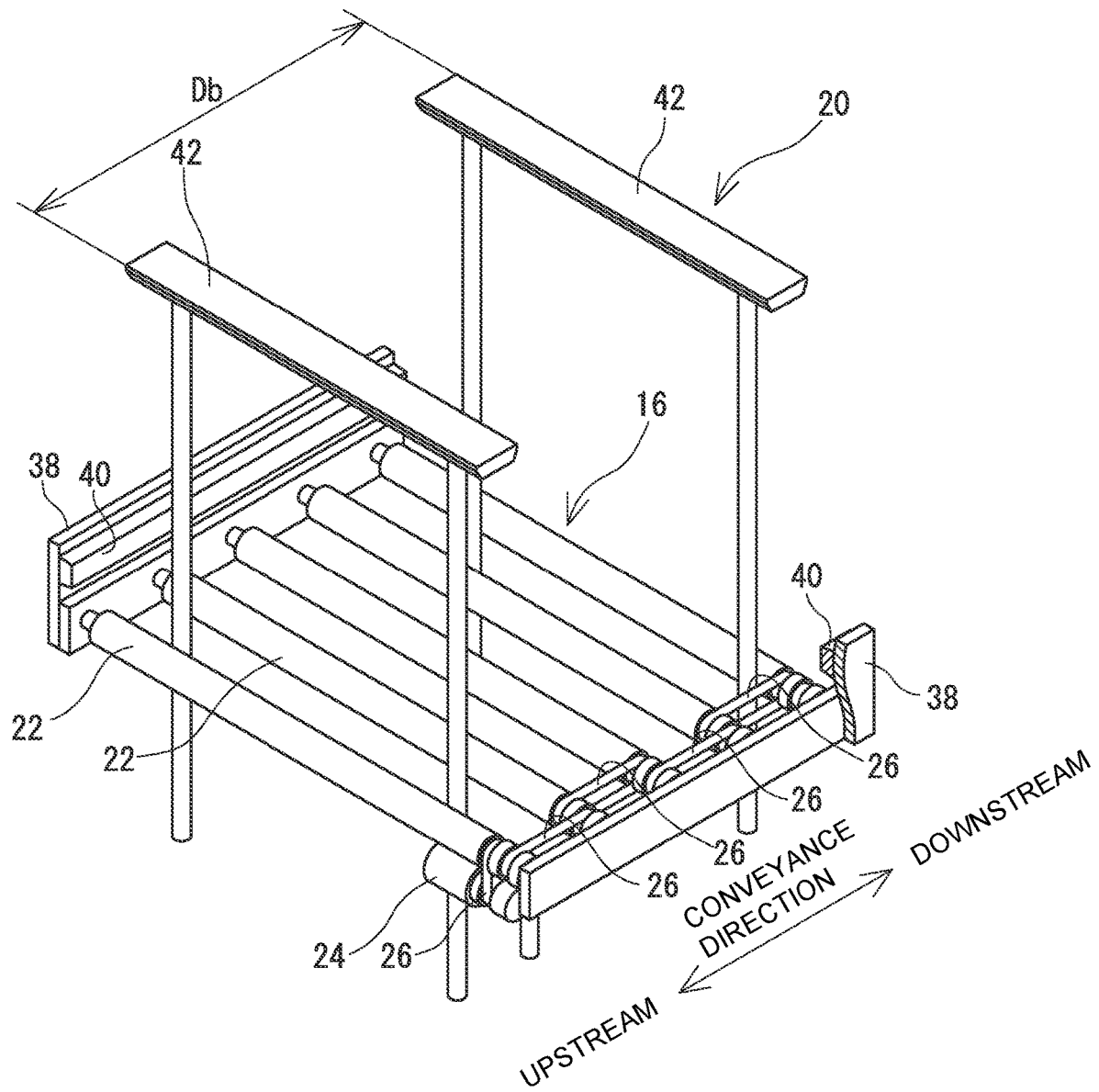
FIG. 6 is a perspective view of a straight unit and a lifter.

FIG. 6 is a perspective view of the straight unit 16 and the lifter 20. The straight unit 16 includes a plurality of (five in the illustrated example) conveyance rollers 22 arranged in parallel. The axial directions of the respective conveyance rollers 22 are parallel to the horizontal direction and orthogonal to the conveyance direction of the cargo 300. Hereinafter, the axial direction of the conveyance roller 22 is referred to as a "conveyance path width direction." The plurality of conveyance rollers 22 are connected in a chain manner by a plurality of belts 26. Each belt 26 is stretched between two adjacent conveyance rollers 22, and transmits rotational power of one conveyance roller 22 to the other conveyance roller 22. Therefore, the plurality of conveyance rollers 22 rotate in synchronization with each other.

A conveyor motor 24 is disposed below the conveyance roller 22. A belt 26 configured to transmit rotational power is also stretched between an output shaft of the conveyor motor 24 and one conveyance roller 22. When the conveyor motor 24 rotates in the forward direction, the plurality of conveyance rollers 22 rotate in a direction of sending out the cargo 300 to the downstream side in the conveyance direction. When the conveyor motor 24 rotates in the reverse direction, the plurality of conveyance rollers 22 rotate in a direction of sending out the cargo 300 to the upstream side in the conveyance direction.

On the opposite sides of the straight unit 16, there are provided partition walls 38 that define a boundary of a conveyance path of the cargo 300. A sliding rail 40 is attached to the partition wall 38. The sliding rail 40 is a member elongated in the conveyance direction, and protrudes inwards in the conveyance path width direction from the partition wall 38. Therefore, although the cargo 300 abuts on the sliding rail 40, the same does not abut on the partition wall 38. The surface of the sliding rail 40 is made of a material having low coefficient of friction such as polytetrafluoroethylene, fluororesin, or the like. The sliding rail 40 is provided, thereby making it possible to prevent the cargo 300 from being rubbed against the partition wall 38 and deteriorating.

Among the plurality of straight units 16, the lifter 20 is provided below the straight unit 16 disposed at the first transfer position Pf. The lifter 20 includes a pair of lifting-and-lowering bars 42. Each of the lifting-and-lowering bars 42 is a bar that is formed to extend in the conveyance path width direction and that is thinner than a gap between two adjacent conveyance rollers 22. The lifting-and-lowering bar 42 is positioned in the gap between two adjacent conveyance rollers 22 in plan view. Further, the lifting-and-lowering bar 42 can be lifted and lowered between a retreat position below the straight unit 16 and a lift position above the straight unit 16. The lifting and lowering of the lifting-and-lowering bar 42 may be performed by a rectilinear mechanism using a motor as a power source, or may be performed by an expansion and contraction mechanism having a hydraulic or pneumatic cylinder.

When the pair of lifting-and-lowering bars 42 ascends from the retreat position to the lift position with the cargo 300 placed on the straight unit 16, the cargo 300 is supported by the pair of lifting-and-lowering bars 42 and lifted from the straight unit 16. In this state, the cargo 300 is delivered from the lifting-and-lowering bar 42 to the hand 58 of the stacker 50, which will be described later.

Figure 7:
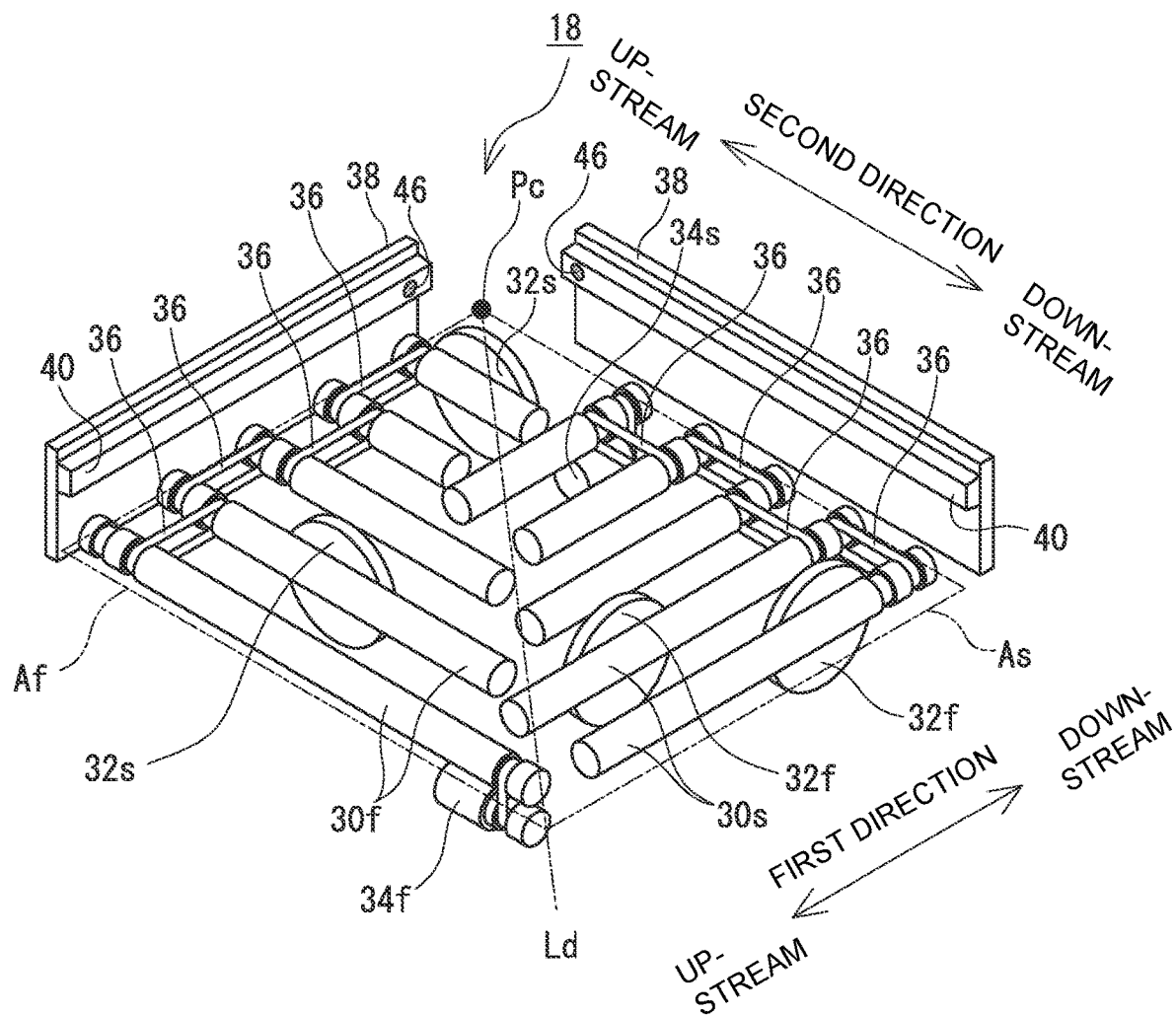
FIG. 7 is a perspective view of a right angle turn unit.
Figure 8:
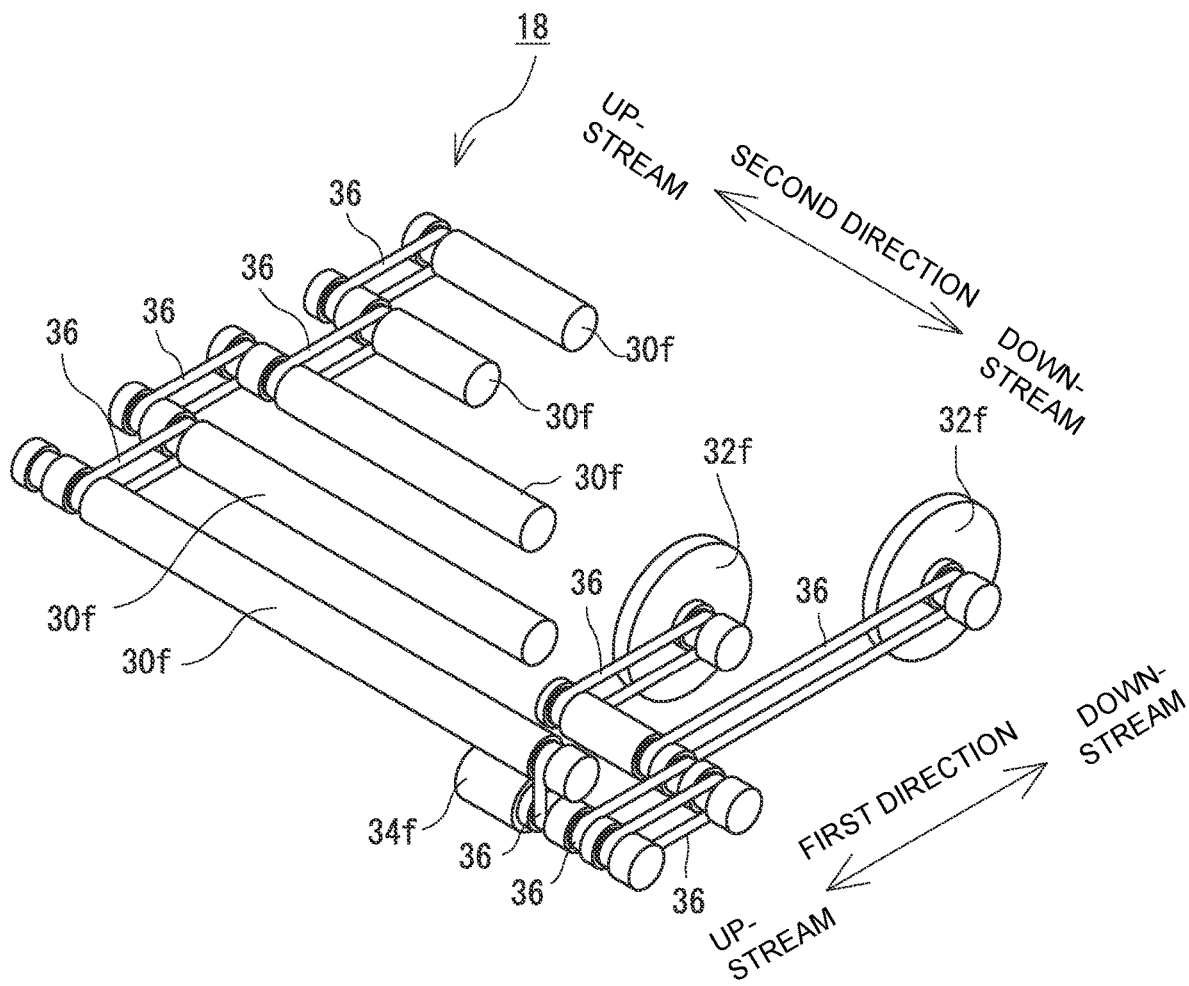
FIG. 8 is a perspective view of the right angle turn unit in which some components are not illustrated.

Next, a configuration of the right angle turn unit 18 will be described with reference to FIGS. 7 and 8. FIG. 7 is a perspective view of the right angle turn unit 18, and FIG. 8 is a perspective view of the right angle turn unit 18 in which some components are not illustrated. The right angle turn unit 18 conveys the cargo 300 by changing, at a right angle, the conveyance direction of the cargo 300 from a first direction to a second direction orthogonal to the first direction.

The right angle turn unit 18 has a substantially quadrangular shape in plan view. Hereinafter, a corner portion which is a downstream end in the first direction and an upstream end in the second direction of the quadrangle is referred to as a "corner portion Pc." The right angle turn unit 18 can be roughly divided into two areas Af and As with a diagonal line Ld passing through the corner portion Pc of the quadrangle as a boundary. A plurality of first conveyance rollers 30f are disposed in the first area Af on the upstream side in the second direction of the diagonal line Ld. The first conveyance roller 30f is a roller that rotates around an axis parallel to the second direction and rotates forward to send the cargo 300 to the downstream side in the first direction. The plurality of the first conveyance rollers 30f are disposed with a gap therebetween in the first direction. The first conveyance roller 30f closer to the downstream end in the first direction has a shorter axial length so that the plurality of first conveyance rollers 30f are substantially accommodated in the first area Af.

A plurality of second conveyance rollers 30s are disposed in the second area As on the upstream side in the second direction of the diagonal line Ld. The second conveyance roller 30s is a roller that rotates around an axis parallel to the first direction and rotates forward to send the cargo 300 to the downstream side in the second direction. The plurality of the second conveyance rollers 30s are disposed with a gap therebetween in the second direction. Further, the second conveyance roller 30s closer to the upstream end in the second direction has a shorter axial length so that the plurality of second conveyance rollers 30s are substantially accommodated in the second area As. The diameter of the second conveyance roller 30s is equal to the diameter of the first conveyance roller 30f, and the height of the top portion of the second conveyance roller 30s (that is, the portion in contact with bottom surface of cargo 300) coincides with the height of the top portion of the first conveyance roller 30f.

In the first area Af, a plurality of (two in the illustrated example) second assist rollers 32s are further disposed. The second assist roller 32s is a roller that rotates around an axis parallel to the first direction; that is, rotates around an axis parallel to the second conveyance roller 30s. The axial dimension of the second assist roller 32s is sufficiently smaller than a gap between two adjacent first conveyance rollers 30f, and the second assist roller 32s is disposed in the gap. The diameter of the second assist roller 32s is sufficiently larger than the diameter of the first conveyance roller 30f, while the height of the top portion of the second assist roller 32s is equal to the height of the top portion of the first conveyance roller 30f. By disposing the second assist roller 32s in the first area Af in this manner, the cargo 300 can be sent in the second direction by the second assist roller 32s immediately after the cargo 300 enters the right angle turn unit 18; in other words, even at the timing when the contact area between the cargo 300 and the second conveyance roller 30s is small.

In the second area As, a plurality of (two in the illustrated example) first assist rollers 32f are further disposed. The first assist roller 32f is a roller that rotates around an axis parallel to the second direction; that is, around an axis parallel to the first conveyance roller 30f. The axial dimension of the first assist roller 32f is sufficiently smaller than a gap between two adjacent second conveyance rollers 30s, and the first assist roller 32f is disposed in the gap. The diameter of the first assist roller 32f is sufficiently larger than the diameter of the second conveyance roller 30s, while the height of the top portion of the first assist roller 32f is equal to the height of the top portion of the second conveyance roller 30s. By providing the first assist roller 32f, the cargo 300 can be sent in the first direction by the first assist roller 32f even at the timing when the contact area between the cargo 300 and the first conveyance roller 30f is small.

A first conveyor motor 34f is disposed below the first conveyance roller 30f. As illustrated in FIG. 8, rotational power output from the first conveyor motor 34f is transmitted to the plurality of first conveyance rollers 30f and the plurality of first assist rollers 32f via a belt 36. As a result, the plurality of first conveyance rollers 30f and the plurality of first assist rollers 32f rotate in synchronization with each other. As described above, the first assist roller 32f has a larger diameter than the second conveyance roller 30s, and the rotation center of the first assist roller 32f is located below the lower end of the second conveyance roller 30s. With such a configuration, interference between the power transmission member (the belt 36 or the like) connecting the first conveyor motor 34f to the first assist roller 32f and the second conveyance roller 30s hardly occurs. As a result, the configuration of the power transmission member can be simplified.

As illustrated in FIG. 7, a second conveyor motor 34s is disposed below the second conveyance roller 30s. Although not illustrated in detail in FIGS. 7 and 8, rotational power output from the second conveyor motor 34s is transmitted to the plurality of second conveyance rollers 30s and the plurality of second assist rollers 32s via the belt 36 in the same manner as that of the first conveyor motor 34f. The second conveyor motor 34s can be driven independently of the first conveyor motor 34f. Therefore, while the first conveyor motor 34f is rotating forward, the second conveyor motor 34s may rotate forward, may rotate rearward, or may stop.

In the present example, the rotational power of the conveyor motors 34f and 34s is transmitted to the rollers 30f, 32f, 30s, and 32s without being decelerated. However, depending on cases, the rotational power may be transmitted to some or all of the rollers 30f, 32f, 30s, and 32s by being decelerated. For example, since the first assist roller 32f has a larger diameter than that of the first conveyance roller 30f, the circumferential speed of the first assist roller 32f is greater than the circumferential speed of the first conveyance roller 30f when the rotational speeds of the first assist roller 32f and the first conveyance roller 30f are the same. The rotational power of the first conveyor motor 34f may be decelerated and transmitted to the first assist roller 32f so that the circumferential speeds of the first assist roller 32f and the first conveyance roller 30f coincide with each other; that is, the rotational speed of the first assist roller 32f becomes lower than the rotational speed of the first conveyance roller 30f. Further, the rotational speeds of the plurality of first conveyance rollers 30f may be changed to be lower or higher toward the downstream side in the first direction.

When the traveling direction of the cargo 300 is changed to the right angle, the controller 130 first rotates forward the first conveyance roller 30f and the first assist roller 32f to send the cargo 300 to the downstream side in the first direction, and then rotates forward the second conveyance roller 30s and the second assist roller 32s to send the cargo 300 to the downstream side in the second direction. The second conveyance roller 30s and the second assist roller 32s may be reversely rotated in parallel with the forward rotation of the first conveyance roller 30f and the first assist roller 32f. The first conveyance roller 30f and the first assist roller 32f may be reversely rotated in parallel with the forward rotation of the second conveyance roller 30s and the second assist roller 32s.

As illustrated in FIG. 7, the partition wall 38 defining a boundary of the conveyance path stands at the downstream end in the first direction and the upstream end in the second direction of the right angle turn unit 18. The partition wall 38 is also provided with the sliding rail 40. The sliding rail 40 is provided, thereby making it possible to prevent the cargo 300 from being rubbed against the partition wall 38 and deteriorating.

The right angle turn unit 18 changes the traveling direction of the cargo 300 to a right angle by adjusting the rotation direction and the drive timing of the two types of conveyance rollers 30f and 30s and the two types of assist rollers 32f and 32s. The reason why the traveling direction of the cargo 300 is changed to the right angle in this manner will be described with reference to FIG. 9.

Figure 9:
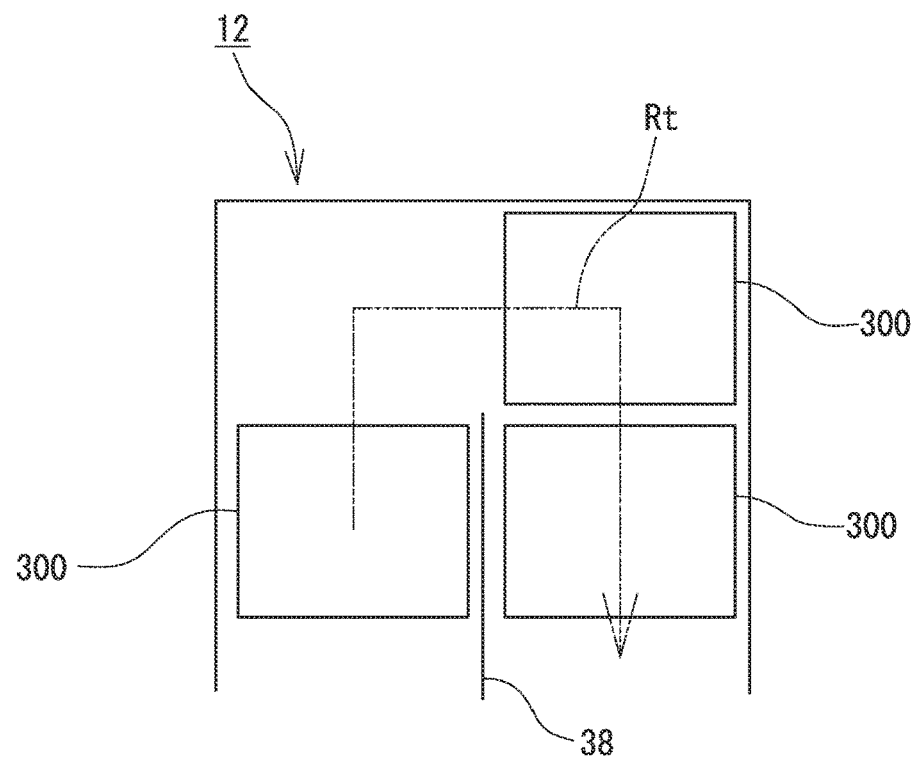
FIG. 9 is a view illustrating the reason why a traveling direction of a cargo is changed to a right angle.
Figure 9:
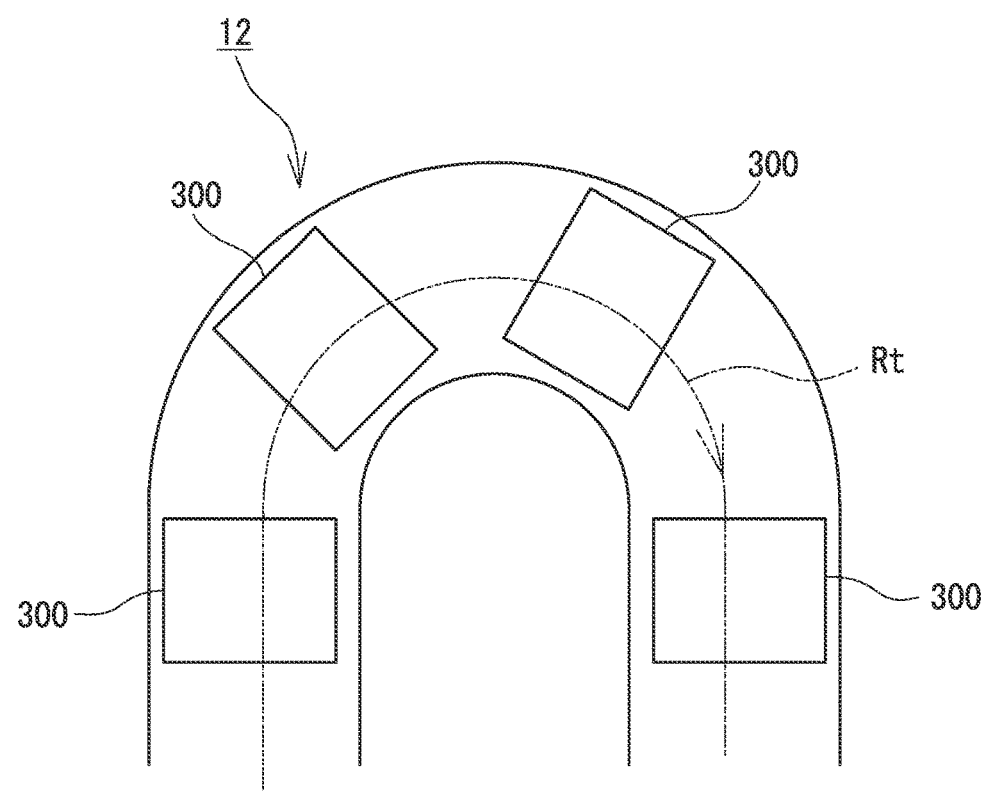

As illustrated in FIG. 9, a case where the cargo 300 is turned back by approximately 180 degrees and conveyed is considered. In this case, as illustrated in the lower part of FIG. 9, it is conceivable that the cargo 300 is moved in the arc shape and turned back. However, in this case, a large gap is formed between the forward path and the return path of the cargo 300. Such a gap therebetween becomes a dead space that cannot be used for conveyance or storage of the cargo 300. On the other hand, as illustrated in the upper part of FIG. 9, when the cargo 300 is bent at the right angle twice, the gap between the forward path and the return path can be theoretically eliminated. Therefore, in a case where the cargo 300 is configured to be redirected at the right angle, occurrence of a dead space can be effectively prevented, thereby improving utilization efficiency of the space.

Here, a label (not illustrated) recording cargo information is attached to each cargo 300. The storage conveyor 12 is provided with a label reader 44 (refer to FIGS. 2 and 4) that reads the cargo information recorded on the label. In the cargo information, identification information on the cargo 300, information on a sender of the cargo 300, information on a destination of the cargo 300, and the like are recorded. By providing the label reader 44, the cargo 300 can be appropriately identified. It is noted that no particular limitation is imposed on the number of the label readers 44 and the installation positions thereof. For example, the label reader 44 may be provided at the first transfer position Pf. By providing the label reader 44 at such a position, the cargo 300 to be delivered to the stacker 50 can be clearly identified, thereby making it possible to reliably prevent erroneous delivery of another cargo 300 that is not requested from the stacker 50.

It is noted that the label attached to the cargo 300 may be a print medium on which the cargo information is printed in the form of characters or barcodes, or may be an IC tag in which the cargo information is recorded as electronic information. When the cargo information is printed in the form of characters, the label reader 44 includes a camera and an OCR device that capture and read character information. In addition, in a case where the cargo information is printed in the form of a barcode, the label reader 44 includes a barcode reader that reads the barcode. When the label is an IC tag, the label reader 44 includes an IC reader that communicates with the IC tag and reads information.

Configuration of Stacker 50

Figure 10:
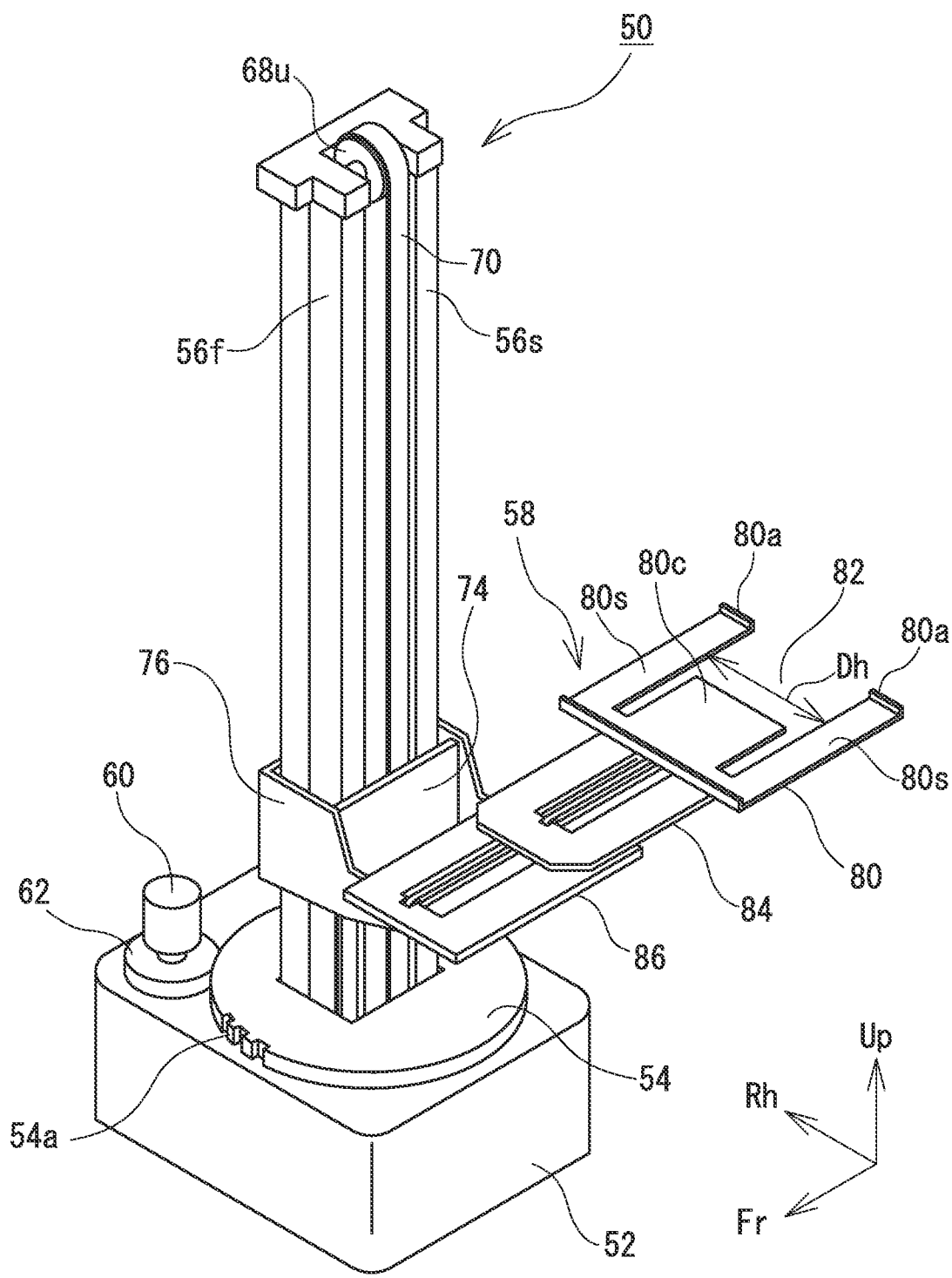
FIG. 10 is a perspective view of a stacker.
Figure 11:
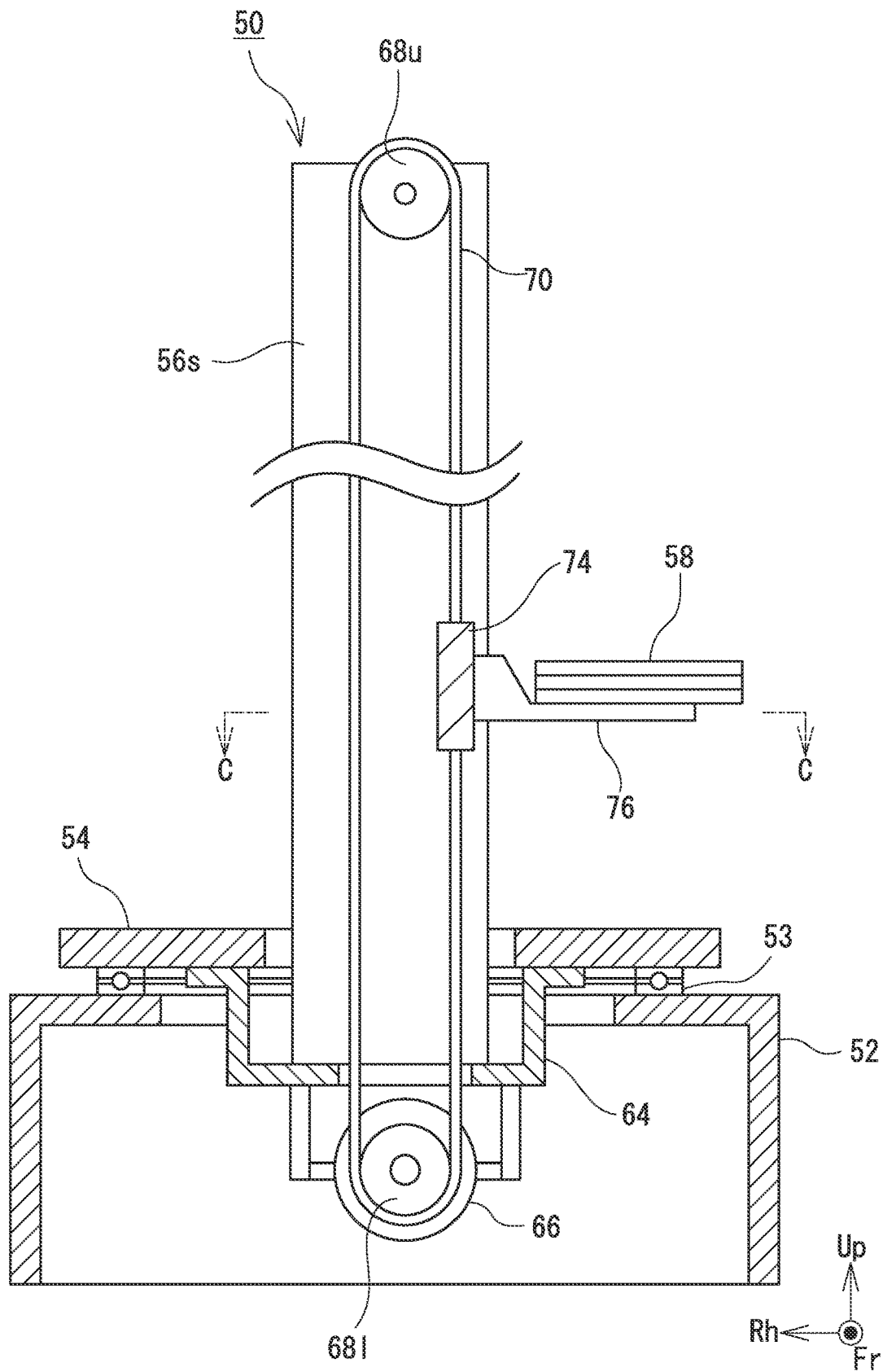
FIG. 11 is a longitudinal cross-sectional view of the stacker.
Figure 12:
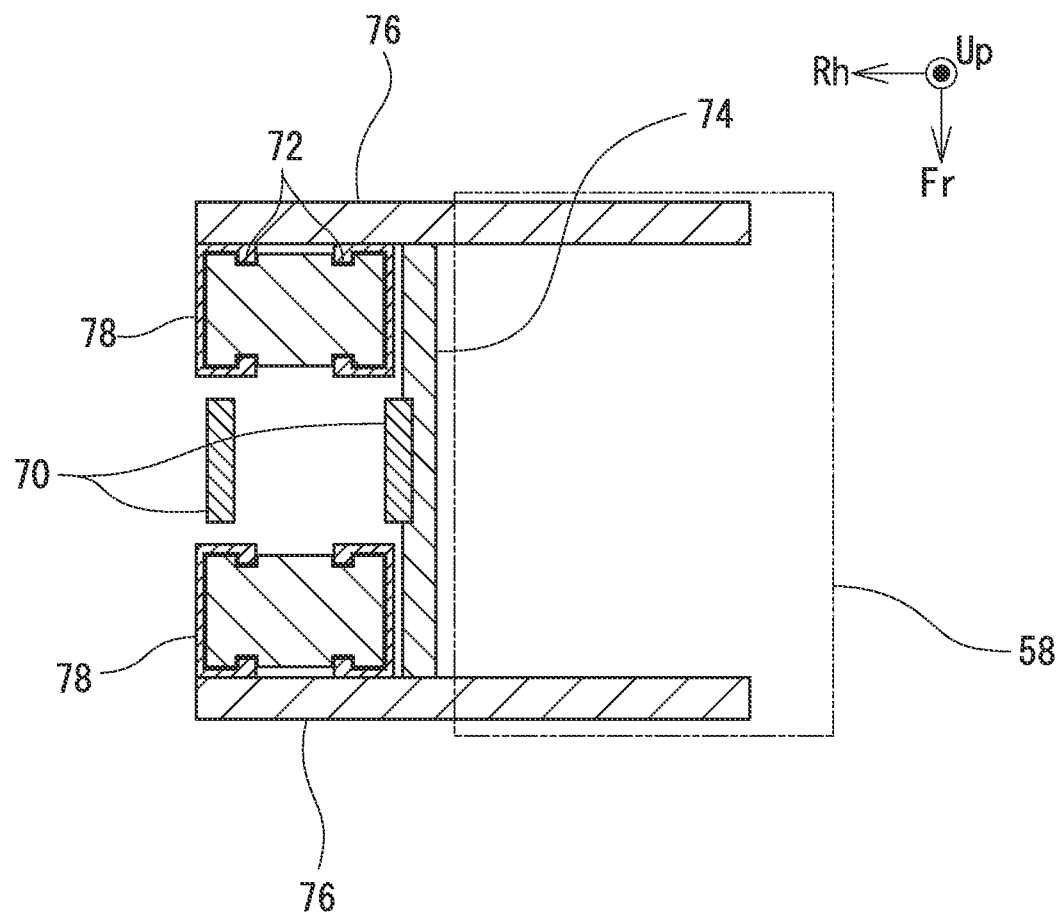
FIG. 12 is a cross-sectional view taken along line C-C in FIG. 11.

Next, the configuration of the stacker 50 will be described. FIG. 10 is a perspective view of the stacker 50. FIG. 11 is a longitudinal cross-sectional view of the stacker 50, and FIG. 12 is a cross-sectional view taken along line C-C in FIG. 11. The stacker 50 is fixed to the floor surface of the vehicle interior. The stacker 50 includes a first main column 56f and a second main column 56s (hereinafter, when the two are not distinguished, they are referred to as a "main column 56") extending in the vehicle vertical direction, and the hand 58 that moves upward and downward along the main column 56 and rotates in the horizontal plane. A mechanism configured to lift, lower, and rotate the hand 58 is not particularly limited. In this example, as illustrated in FIG. 11, the hand 58 is moved upward and downward by a linear motion mechanism configured to convert rotational power of a lifting-and-lowering motor 66 into a linear motion by a pair of pulleys 68u and 68l and a belt 70. In this example, the main column 56 is fixed to a rotary table 54 that rotates with driving of a rotary motor 60, and the hand 58 is rotated together with the main column 56. Hereinafter, the configuration of the stacker 50 will be described in detail.

As illustrated in FIGS. 10 and 11, the stacker 50 has a base 52 fixed to the floor surface of the vehicle. The inside of the base 52 is hollow and can accommodate the lower pulley 68l and the lifting-and-lowering motor 66. The rotary table 54 is attached to the upper surface of the base 52 via a bearing 53 so as to be rotatable in the plane parallel to the upper surface of the base 52. A gear 54a (refer to FIG. 10) is formed on the peripheral edge of the rotary table 54. A gear 62 that meshes with the gear 54a of the rotary table 54 and the rotary motor 60 that rotates the gear 62 are further attached to the upper surface of the base 52. The rotary motor 60 is driven to rotate the rotary table 54.

As illustrated in FIG. 11, a support bracket 64 is fixed to the bottom surface of the rotary table 54. The main column 56 stands from the upper surface of the support bracket 64. A hole allowing the main column 56 to pass therethrough is formed at the center of the rotary table 54. The lifting-and-lowering motor 66 is connected and fixed to the bottom surface of the support bracket 64. Further, the lower pulley 68l is connected to an output shaft of the lifting-and-lowering motor 66. Here, the support bracket 64 is fixed to the rotary table 54 and rotates together with the rotary table 54. The main column 56 and the lifting-and-lowering motor 66 fixed to the support bracket 64 also rotate together with the rotary table 54.

The first main column 56f and the second main column 56s are disposed to face each other with the belt 70 interposed therebetween. The upper pulley 68u rotatable around an axis parallel to the vehicle forward-and-rearward direction is attached near the upper ends of the first main column 56f and the second main column 56s. As described above, the lifting-and-lowering motor 66 is disposed below the main column 56, and the lower pulley 68l is connected to the output shaft of the lifting-and-lowering motor 66. Further, the belt 70 is stretched between the upper pulley 68u and the lower pulley 68l.

As illustrated in FIG. 12, the hand 58 is coupled to the middle of the belt 70 via a support arm 76 and a coupling plate 74. The coupling plate 74 is a plate fixed in the middle of the belt 70 and configured to move upward and downward together with the belt 70. A pair of support arms 76 is fixed to the opposite ends of the coupling plate 74. The hand 58 is fixed to the upper surfaces of the pair of support arms 76. A slide nut 78 is also fixed to the support arm 76. The slide nut 78 has a claw to be inserted into a guide rail 72 formed in the first main column 56f and the second main column 56s, and slides along the guide rail 72.

When the lower pulley 68l is rotated by the lifting-and-lowering motor 66, the belt 70 moves circularly, whereby the coupling plate 74 and the hand 58 move upward and downward along the main column 56. In addition, since the hand 58 is connected to the main column 56 via the support arm 76, when the rotary table 54 rotates with the driving of the rotary motor 60, the hand 58 also rotates together with the main column 56.

Here, in order to lift, lower, and rotate the hand 58, it is necessary to provide a relatively large and heavy lifting-and-lowering motor 66 and the rotary motor 60. In this example, both the lifting-and-lowering motor 66 and the rotary motor 60 are provided at the lower portion of the stacker 50. Therefore, the center of gravity of the stacker 50 is lowered, thereby improving stability of the stacker 50. In particular, in this example, since the hand 58 is rotated together with the main column 56, the rotary motor 60 can be installed away from the hand 58, and the rotary motor 60 can be easily installed at the lower portion of the stacker 50.

However, when rigidity of the stacker 50 can be appropriately secured, only the hand 58 may be rotated without rotating the main column 56. For example, an annular plate surrounding the two main columns 56f and 56s may be attached to the support arm 76, the rotary table 54, the gear 62, and the rotary motor 60 may be attached to the annular plate, and the hand 58 may be attached to the rotary table 54.

Further, a rotation mechanism and a lifting-and-lowering mechanism of the hand 58 may be appropriately changed. For example, in order to move the hand 58 upward or downward, a linear motion mechanism using a ball screw may be adopted instead of the linear motion mechanism using the belt 70 and the pulleys 68*u* and 68*l*. The hand 58 may be moved upward or downward using a hydraulic cylinder, a pneumatic cylinder, or a linear motor instead of the lifting-and-lowering motor 66.

Figure 13:
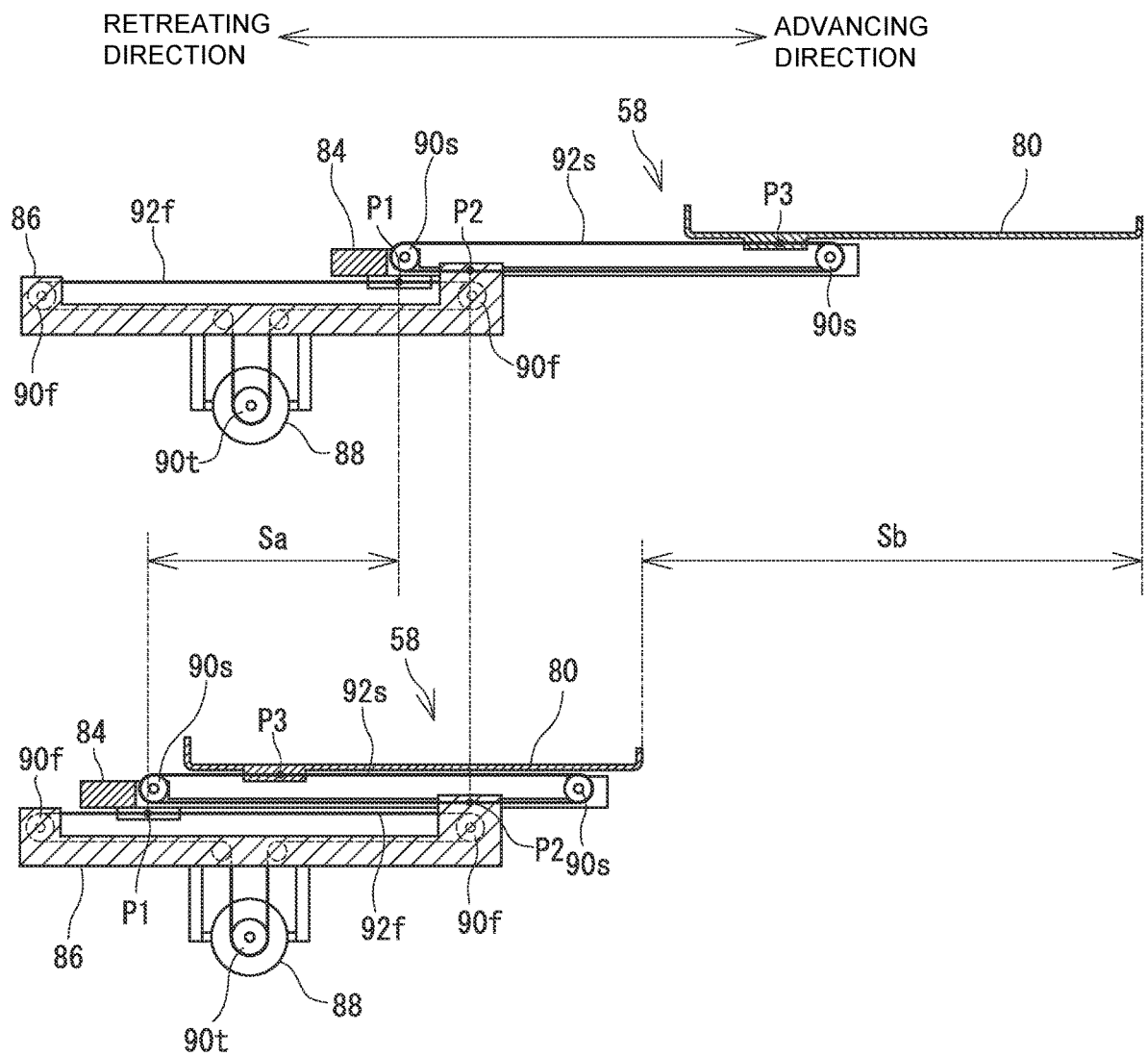
FIG. 13 is a schematic view illustrating a configuration of a hand.

Next, a configuration of the hand 58 will be described with reference to FIGS. 10 and 13. FIG. 13 is a schematic view illustrating a configuration of the hand 58. As illustrated in FIGS. 10 and 13, the hand 58 includes a proximal end plate 86, an intermediate plate 84, and a fork plate 80, and the three plates 80, 84, and 86 slide and move with each other, thereby allowing the entire hand 58 to expand and contract. The upper part of FIG. 13 illustrates a state in which the hand 58 expands, and the lower part of FIG. 13 illustrates a state in which the hand 58 contracts. Hereinafter, a direction in which the fork plate 80 moves when the state is shifted from the contraction state to the expansion state is referred to as an "advancing direction," and a direction in which the fork plate 80 moves when the state is shifted from the expansion state to the contraction state is referred to as a "retreating direction."

As illustrated in FIG. 10, the fork plate 80 includes a central portion 80*c*, and a pair of side portions 80*s* provided on the opposite sides of the central portion 80*c*. The side portion 80*s* protrudes further in the advancing direction than the central portion 80*c*, and the fork plate 80 has a shape similar to a fork as a whole. From another point of view, the fork plate 80 has a substantially rectangular notch 82 formed at the tip in the advancing direction thereof. A width Dh of the notch 82 is smaller than the width of the smallest cargo 300 among the cargos 300 handled by the cargo handling system 10. The width Dh of the notch 82 is larger than a width Db (refer to FIG. 6) of the lifter 20 including the two lifting-and-lowering bars 42. A protrusion 80*a* protruding upward is formed at the tip of the side portion 80*s* in the advancing direction.

As illustrated in FIG. 13, a pair of first pulleys 90*f* is attached near the opposite ends of the proximal end plate 86 in the advancing-and-retreating direction. A hand motor 88 is disposed below the proximal end plate 86. The hand motor 88 is fixed to the proximal end plate 86. A third pulley 90*t* is connected to an output shaft of the hand motor 88. A first belt 92*f* is stretched around the pair consisting of first pulley 90*f* and third pulley 90*t*. The first belt 92*f* moves circularly as the hand motor 88 is driven.

The intermediate plate 84 is a plate partly stacked on the upper side of the proximal end plate 86. A pair of second pulleys 90*s* are attached to the opposite ends of the intermediate plate 84 in the advancing-and-retreating direction. A second belt 92*s* is stretched around the pair of second pulleys 90*s*. The fork plate 80 is partly stacked on the upper side of the intermediate plate 84.

Here, a predetermined first fixing point P1 of the first belt 92*f* is fixed to the end portion of the intermediate plate 84 in the retreating direction. The first fixing point P1 is a position of the first belt 92*f* near the first pulley 90*f* on the advancing direction side and above the rotation axis of the first pulley 90*f* in the expansion state.

A predetermined second fixing point P2 of the second belt 92*s* is fixed to the end portion of the proximal end plate 86 on the advancing direction side. The second fixing point P2 is a position of the second belt 92*s* near the second pulley 90*s* on the retreating direction side and below the rotation axis of the second pulley 90*s* in the expansion state. Further, a predetermined third fixing point P3 of the second belt 92*s* is fixed to the end portion of the fork plate 80 on the retreating direction side. The third fixing point P3 is a position of the second belt 92*s* near the second pulley 90*s* on the retreating direction side and above the rotation axis of the second pulley 90*s* in the expansion state. From another point of view, the third fixing point P3 is at a position shifted from the second fixing point P2 by about 180 degrees.

With the above configuration, a movement stroke Sb of the fork plate 80 becomes twice a circulating movement distance Sa of the first pulley 90*f*, and the expansion-and-contraction stroke of the hand 58 becomes large. For example, it is assumed that the hand motor 88 is driven in the expansion state to move the first belt 92*f* circularly so that the first fixing point P1 approaches the proximal end side by the distance Sa. In this case, the intermediate plate 84 fixed to the first fixing point P1 of the first belt 92*f* and the fork plate 80 connected to the intermediate plate 84 move by the distance Sa in the retreating direction. The second belt 92*s* is fixed to the proximal end plate 86 at the second fixing point P2. Therefore, when the intermediate plate 84 moves in the retreating direction, the second belt 92*s* moves circularly by the distance Sa to maintain the absolute position of the second fixing point P2. As a result, the second fixing point P2 moves in the advancing direction by the distance Sa with respect to the intermediate plate 84, and the third fixing point P3 located on the opposite side of the second fixing point P2 across the second pulley 90*s* moves in the retreating direction by the distance Sa with respect to the intermediate plate 84. As a result, at the third fixing point P3, the fork plate 80 fixed to the second belt 92*s* moves in the retreating direction by the distance Sa with respect to the intermediate plate 84. As a result, the fork plate 80 can move by the distance Sb=2×Sa, which is twice the circulating movement amount Sa of the first belt 92*f*.

Figure 14A:
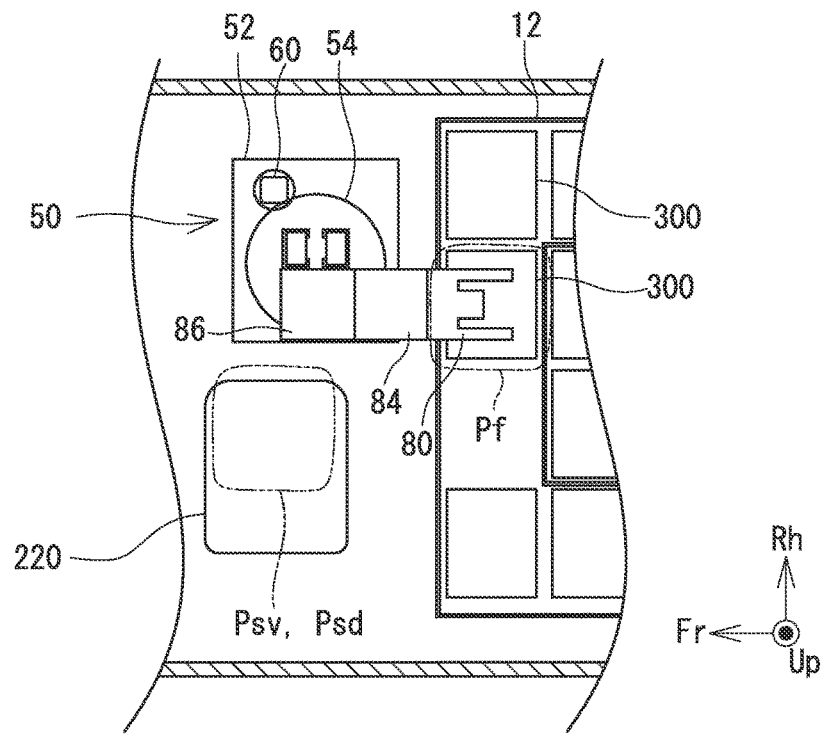
FIG. 14A is a view illustrating a state in which the hand enters a first transfer position.
Figure 14B:
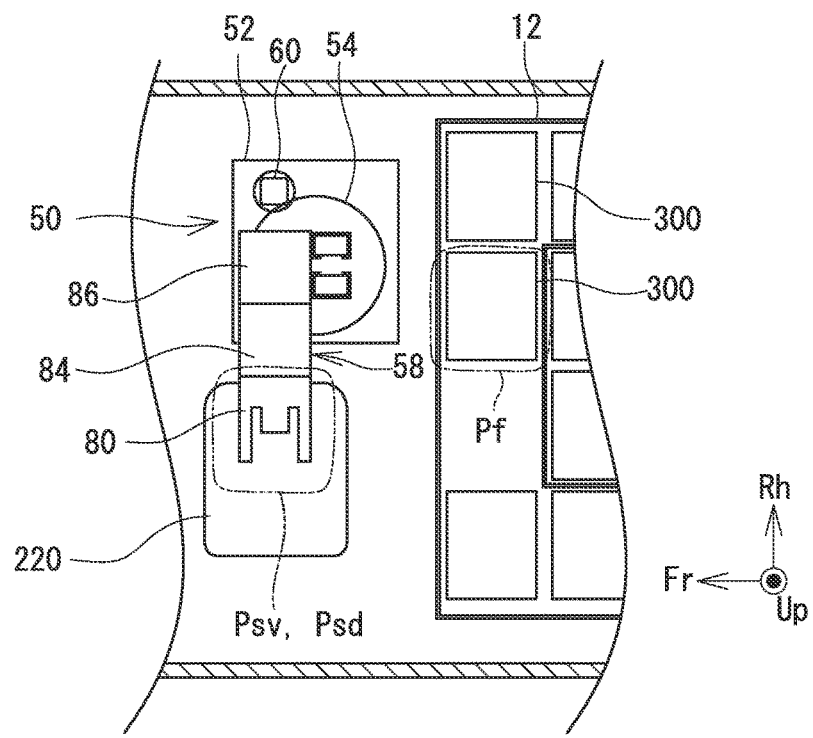
FIG. 14B is a view illustrating a state in which the hand enters a second transfer position.

The stacker 50 can cause the fork plate 80 to enter the first transfer position Pf and the second transfer position Ps by combining the rotation, lifting-and-lowering, and expansion-and-contraction of the hand 58. FIG. 14A illustrates a state in which the hand 58 enters the first transfer position Pf, and FIG. 14B illustrates a state in which the hand 58 enters the second transfer position Ps.

When the fork plate 80 is caused to enter the first transfer position Pf, as illustrated in FIG. 14A, the hand 58 is rotated up to an angle at which the expanding-and-contracting direction of the hand 58 becomes parallel to the vehicle forward-and-rearward direction, the hand 58 is lifted and lowered to the same height as the first transfer position Pf, and the hand 58 expands. When the fork plate 80 is caused to enter the second transfer position Ps (that is, the UGV transfer position Psv or the drone transfer position Psd), as illustrated in FIG. 14B, the hand 58 is rotated up to an angle at which the expanding-and-contracting direction of the hand 58 becomes parallel to the vehicle width direction, the hand 58 is lifted and lowered to the same height as the second transfer position Ps, and the hand 58 expands.

As is apparent from the above description, according to the present example, the stacker 50 transfers the cargo 300 between the first transfer position Pf and the second transfer position Ps in a state of being fixed to the vehicle. Therefore, it is not necessary to separately secure a space for movement of the stacker 50, and the space in the vehicle can be effectively used. It is noted that the configuration of the stacker 50 described above is an example. The stacker 50 may be appropriately changed so long as the same is fixed in the vehicle and can transfer the cargo 300 between the first transfer position Pf and the second transfer position Ps.

Configuration of Relay Apparatus 100

Figure 15A:
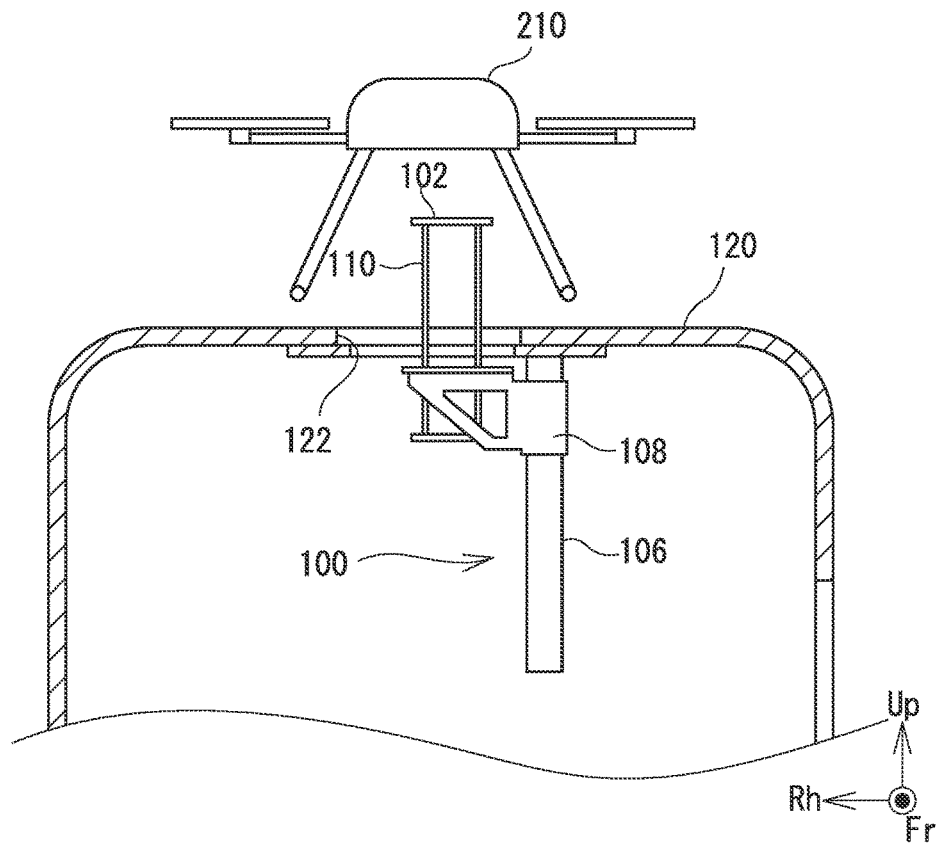
FIG. 15A is a view of the periphery of a relay apparatus when a lifting-and-lowering plate is lifted.
Figure 15B:
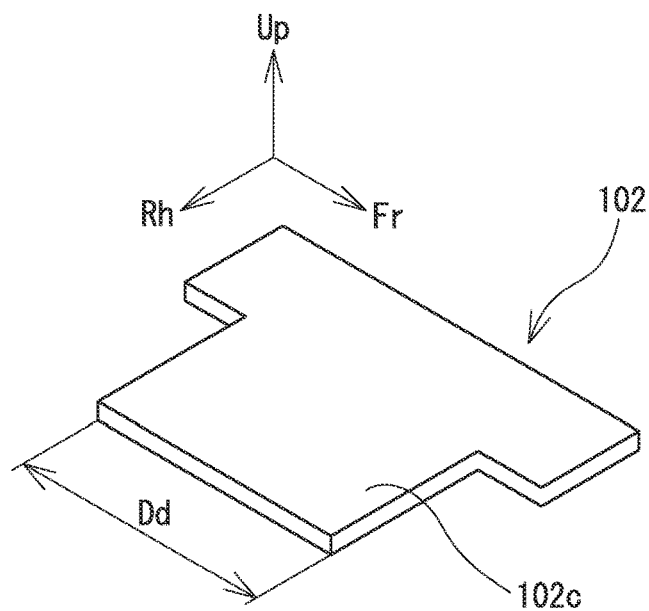
FIG. 15B is a perspective view of the lifting-and-lowering plate.

Next, a configuration of the relay apparatus 100 will be described with reference to FIGS. 3, 15A, and 15B. FIG. 15A is a view of the periphery of the relay apparatus 100 when the lifting-and-lowering plate 102 is lifted. FIG. 15B is a perspective view of the lifting-and-lowering plate 102. As described above, the relay apparatus 100 is an apparatus that mediates between the stacker 50 and the drone 210. As illustrated in FIGS. 3 and 15A, the relay apparatus 100 includes the lifting-and-lowering plate 102 that moves upward and downward along an axis parallel to the vehicle vertical direction, the axis passing through the roof opening 122. The relay apparatus 100 lifts and lowers the cargo 300 by placing the cargo 300 on the lifting-and-lowering plate 102.

The lifting-and-lowering plate 102 is a flat plate having a size capable of passing through the roof opening 122. More specifically, as illustrated in FIG. 15B, the lifting-and-lowering plate 102 has a central portion 102c in the vehicle forward-and-rearward direction largely protruding toward the stacker 50, and has a substantially T-shaped outer shape in plan view. In the lifting-and-lowering plate 102, the central portion 102c protruding toward the stacker 50 has a size capable of being accommodated in the notch 82 of the fork plate 80. That is, a width Dd of the central portion 102c is smaller than width Dh of the notch 82 of the fork plate 80.

The relay apparatus 100 is provided with a lifting-and-lowering mechanism that lifts and lowers the lifting-and-lowering plate 102. No particular limitation is imposed on the configuration of the lifting-and-lowering mechanism so long as the lifting-and-lowering plate 102 can be lifted and lowered between the drone transfer position Psd below the roof 120 and a predetermined position above the roof 120. In the present example, the lifting-and-lowering mechanism includes a fixed guide 106 fixed to the roof 120, a first frame 108 that moves upward and downward along the fixed guide 106, and a second frame 110 that moves upward and downward with respect to the first frame 108.

The first frame 108 moves upward and downward by, for example, a belt-type linear motion mechanism similar to the support arm 76 of the stacker 50. That is, two pulleys (not illustrated) are respectively attached near the upper end and near the lower end of the fixed guide 106, and a belt (not illustrated) is stretched between the two pulleys. The first frame 108 is mechanically connected to a part of the belt, and moves upward and downward as the belt moves circularly. A motor (not illustrated) is connected to one pulley, and the first frame 108 moves upward and downward as the motor is driven.

The lifting-and-lowering plate 102 is fixed to the upper end of the second frame 110. Various linear motion mechanisms can also be used to lift and lower the second frame 110. For example, similarly to the support arm 76 and the first frame 108, the second frame 110 may move upward and downward by a belt-type linear motion mechanism. As another mode, the second frame 110 may move upward and downward by a linear motion mechanism that converts rotational power of a motor into linear motion with a ball screw, a rack pinion, or the like, or a linear motion mechanism using a hydraulic cylinder or a pneumatic cylinder. In any case, by adopting a two-step lifting-and-lowering system in which the first frame 108 and the second frame 110 are lifted and lowered, respectively, it is possible to secure a large lifting-and-lowering stroke while suppressing an increase in size of the entire relay apparatus 100.

Delivery of Cargo from Storage Conveyor to Stacker

Next, delivery of the cargo 300 from the storage conveyor 12 to the stacker 50 will be described with reference to FIG. 16. As described above, the straight unit 16 and the lifter 20 are disposed at the first transfer position Pf. The lifter 20 includes the pair of lifting-and-lowering bars 42 that can be lifted and lowered through a gap between the adjacent conveyance rollers 22.

Figure 16:
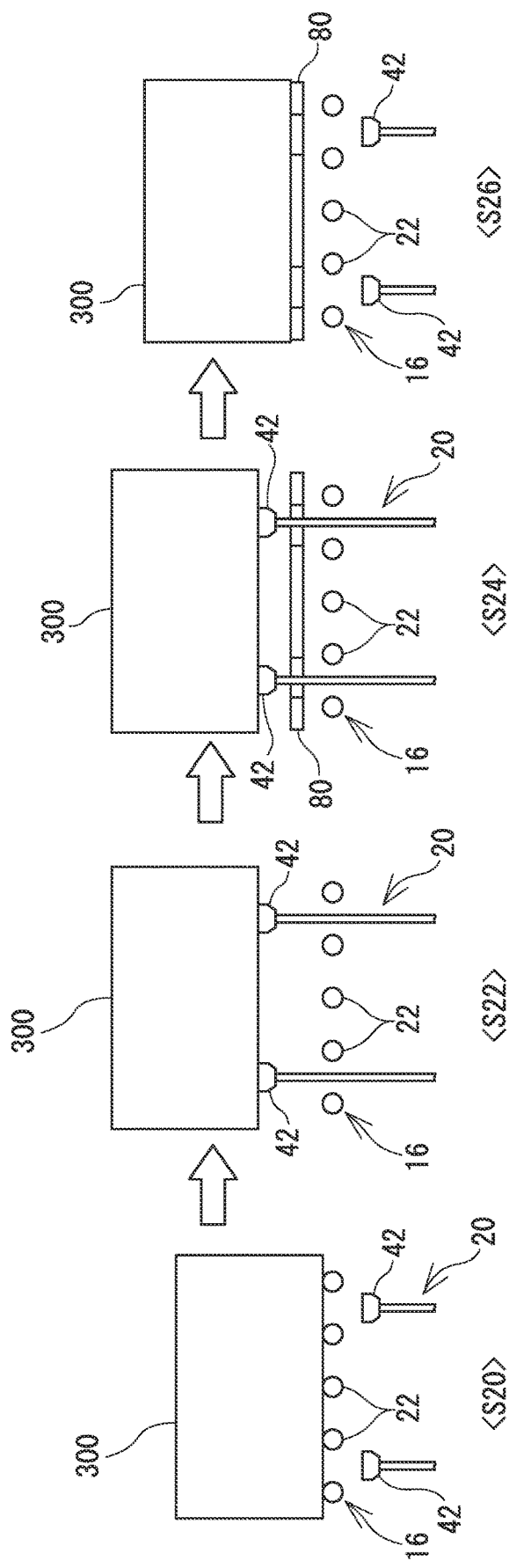
FIG. 16 is a view illustrating a flow of delivery of a cargo from the storage conveyor to the stacker.

When the cargo 300 is delivered to the stacker 50, the controller 130 conveys the target cargo 300 up to the straight unit 16 at the first transfer position Pf, as illustrated in a state S20 of FIG. 16. Subsequently, as illustrated in a state S22, the controller 130 raises the pair of lifting-and-lowering bars 42 up to the lift position above the conveyance roller 22. As a result, the cargo 300 is lifted from the straight unit 16.

In this state, the controller 130 inserts the fork plate 80 of the hand 58 of the stacker 50 between the straight unit 16 and the cargo 300. Specifically, the controller 130 moves the hand 58 upward and downward up to an intermediate height position between the straight unit 16 and the cargo 300 in the contraction state. In addition, the controller 130 rotates the hand 58 up to a posture in which the expanding-and-contracting direction is parallel to the vehicle forward-and-rearward direction. Thereafter, the controller 130 cause the hand 58 to expand. As a result, the fork plate 80 of the hand 58 is inserted between the straight unit 16 and the cargo 300. A state S24 in FIG. 16 illustrates this state.

Thereafter, as illustrated in a state S26, the controller 130 lowers the lifting-and-lowering bar 42 up to the retreat position below the conveyance roller 22. In the process of lowering the pair of lifting-and-lowering bars 42, the cargo 300 supported by the pair of lifting-and-lowering bars 42 is caught by the fork plate 80 and left behind on the fork plate 80. In other words, the cargo 300 is delivered from the lifting-and-lowering bar 42 to the fork plate 80. Then, the delivery of the cargo 300 from the storage conveyor 12 to the stacker 50 is completed.

Figure 19:
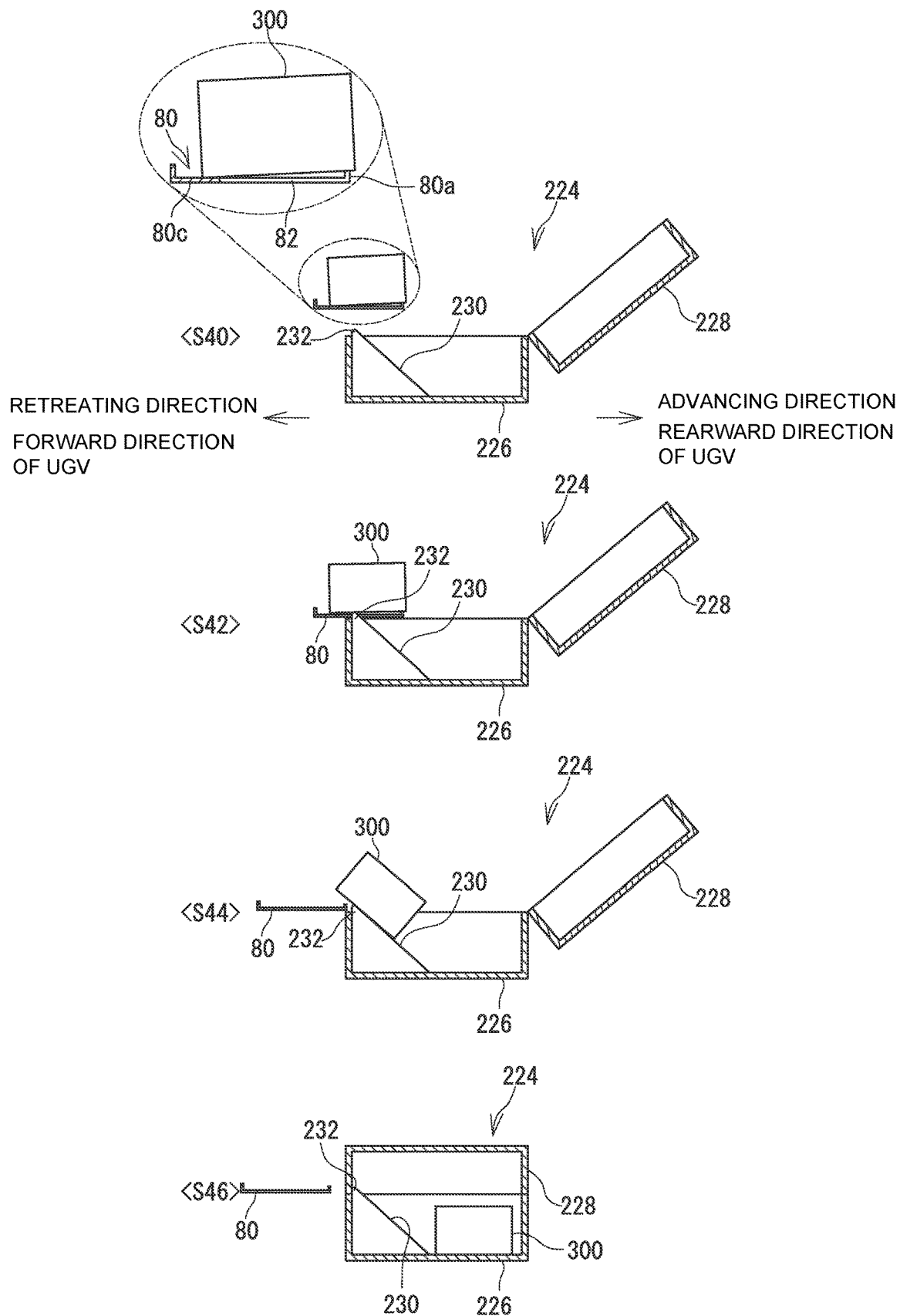
FIG. 19 is a view illustrating a flow of delivery of a cargo.

When the cargo 300 is placed on the fork plate 80, as illustrated in a state S40 of FIG. 19, a part of the cargo 300 protrudes outwards from the tip of the fork plate 80. That is, the bottom surface of the cargo 300 is stretched between the central portion 80c of the fork plate 80 and the protrusion 80a, and the area where the cargo 300 and the fork plate 80 are in direct contact with each other is reduced. This configuration is to facilitate delivery of the cargo 300 to the UGV 220, which will be described later.

When the cargo 300 is delivered from the stacker 50 to the storage conveyor 12, the procedure reverse to the above procedure is performed. That is, in this case, the fork plate 80 on which the cargo 300 is placed moves to the upper side of the straight unit 16 (S26), and then the pair of lifting-and-lowering bars 42 ascends to lift the cargo 300 (S24). Then, the fork plate 80 retreats from the first transfer position Pf (S22), and the lifting-and-lowering bar 42 is lowered up to the lower side of the straight unit 16 (S20).

Delivery of Cargo from Stacker to Relay Apparatus

Figure 17:
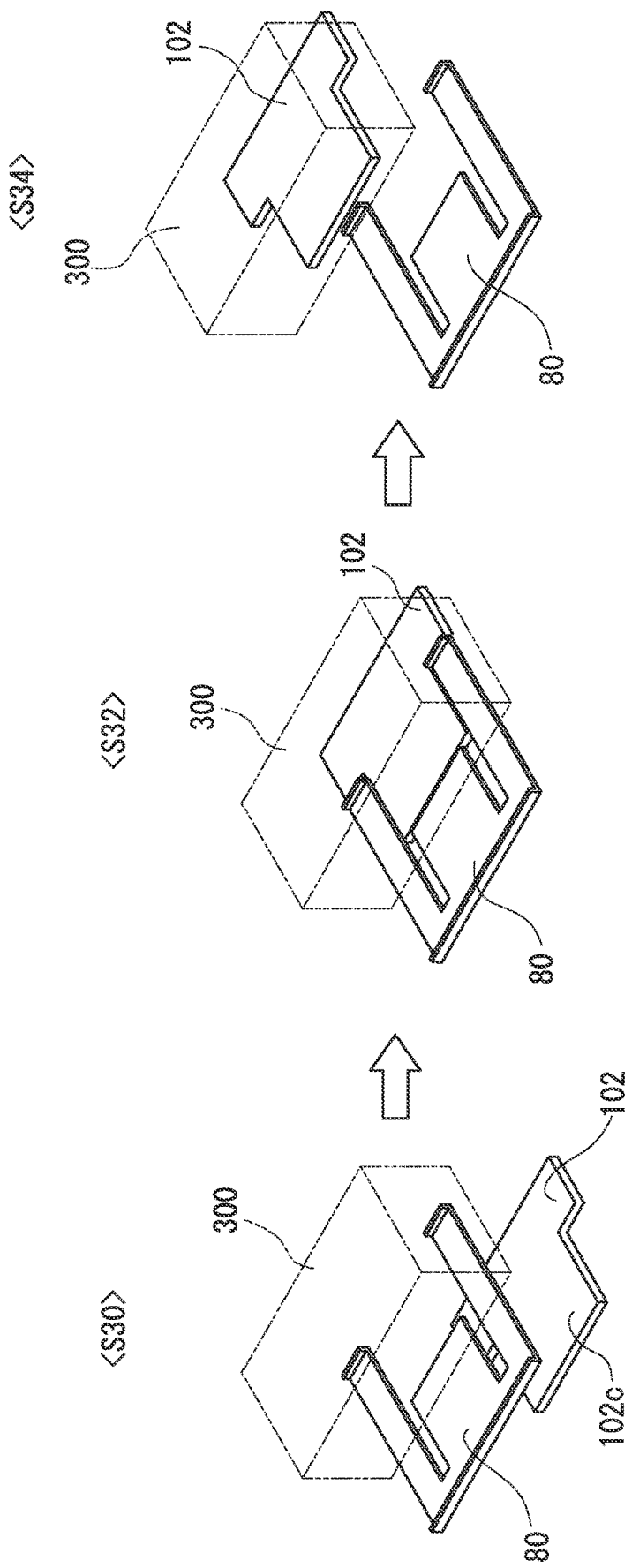
FIG. 17 is a view illustrating a flow of delivering a cargo from the stacker to the relay apparatus.

Next, processing of delivering the cargo 300 from the stacker 50 to the relay apparatus 100 will be described with reference to FIG. 17. In this case as well, similarly to the transfer of the cargo 300 to and from the storage conveyor 12 described above, the fork plate 80 and the lifting-and-lowering plate 102 are caused to pass by each other vertically to deliver the cargo 300. Specifically, first, the hand 58 on which the cargo 300 is placed is brought into a contraction state, and in this state, the same is raised up to a position higher than the lifting-and-lowering plate 102. Thereafter, the hand 58 is caused to rotate and expand to position the fork plate 80 on the upper side of the lifting-and-lowering plate 102, as illustrated in a state S30.

Subsequently, the controller 130 raises the lifting-and-lowering plate 102 up to the upper side of the fork plate 80, as illustrated in a state S32. At this time, the central portion 102c of the lifting-and-lowering plate 102 passes through the notch 82 of the fork plate 80. On the other hand, the cargo 300 is caught by the lifting-and-lowering plate 102 and lifted from the fork plate 80, as illustrated in a state S34. As described above, the delivery of the cargo 300 from the stacker 50 to the relay apparatus 100 is completed. Thereafter, the relay apparatus 100 further raises the lifting-and-lowering plate 102 to carry the cargo 300 up to the upper side of the roof 120. Finally, the cargo 300 is delivered to the drone 210. In a case where the cargo 300 is delivered from the relay apparatus 100 to the stacker 50, a procedure reverse to the above procedure is executed.

As described above, in the present example, when the cargo 300 is delivered from the stacker 50 to the drone 210 or from the drone 210 to the stacker 50, the relay apparatus 100 mediates therebetween. As a result, the maximum lift position of the hand 58 can be suppressed below the roof 120, and the height of the stacker 50 can be reduced. By reducing the height of the stacker 50, the center of gravity of the stacker 50 is lowered, thereby further improving the stability of the stacker 50 in the vehicle.

Delivery of Cargo from Stacker to UGV

Figure 18:
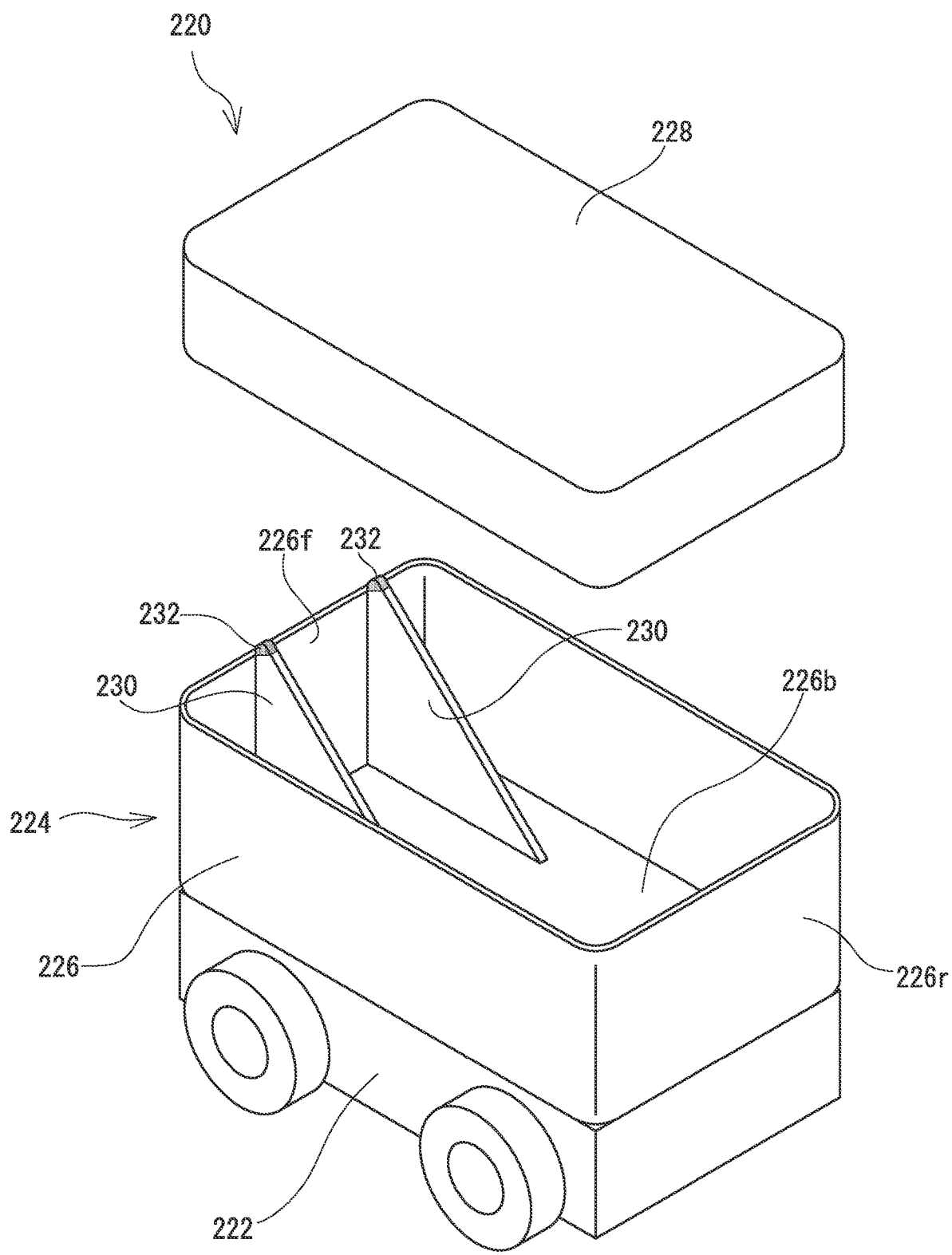
FIG. 18 is a schematic perspective view of a UGV.

Next, delivery of the cargo 300 from the stacker 50 to the UGV 220 will be described. First, the UGV 220 used in the present example will be briefly described. FIG. 18 is a schematic perspective view of the UGV 220.

The UGV 220 includes a traveling unit 222 and a container 224 that houses the cargo 300. The traveling unit 222 is a unit capable of autonomously traveling in a state where the container 224 is mounted thereon. No particular limitation is imposed on the configuration of the traveling unit 222, but, for example, the traveling unit 222 may include wheels, a motor that applies power to the wheels, a battery that supplies power to the motor, a steering mechanism that steers the wheels, a control apparatus that controls driving of these components, and the like.

The container 224 is a container fixed to the upper side of the traveling unit 222 and houses the cargo 300. The container 224 can be roughly divided into a box-shaped main body 226 and a lid body 228. The box-shaped main body 226 is a box-shaped container, the upper end of which is largely opened. A pair of ramp plates 230 stand from a bottom wall 226b of the box-shaped main body 226. The ramp plate 230 is a right-angled triangular plate member having an oblique side inclined rearward and downward. The upper front apex of the ramp plate 230 protrudes upward from the upper end of a front wall 226f of the box-shaped main body 226. This apex functions as a contact portion 232 that first comes into contact with the bottom surface of the cargo 300 at the time of receiving the cargo 300. The surface of the contact portion 232 has an anti-slip function of exerting high frictional force with the bottom surface of the cargo 300. In order to perform the anti-slip function, the surface or the whole of the contact portion 232 may be made of a soft or elastic material such as rubber or urethane gel, or irregularities for enhancing friction may be formed on the surface of the contact portion 232.

The lid body 228 covers the upper end opening of the box-shaped main body 226 so as to be openable and closable. No particular limitation is imposed on the configuration of the lid body 228. In the present example, the lid body 228 is connected to a rear wall 226r of the box-shaped main body 226 via a hinge (not illustrated), and rotates around the hinge to open and close the box-shaped main body 226. The opening and closing operation of the lid body 228 is performed electrically using a motor or the like.

Figure 20A:
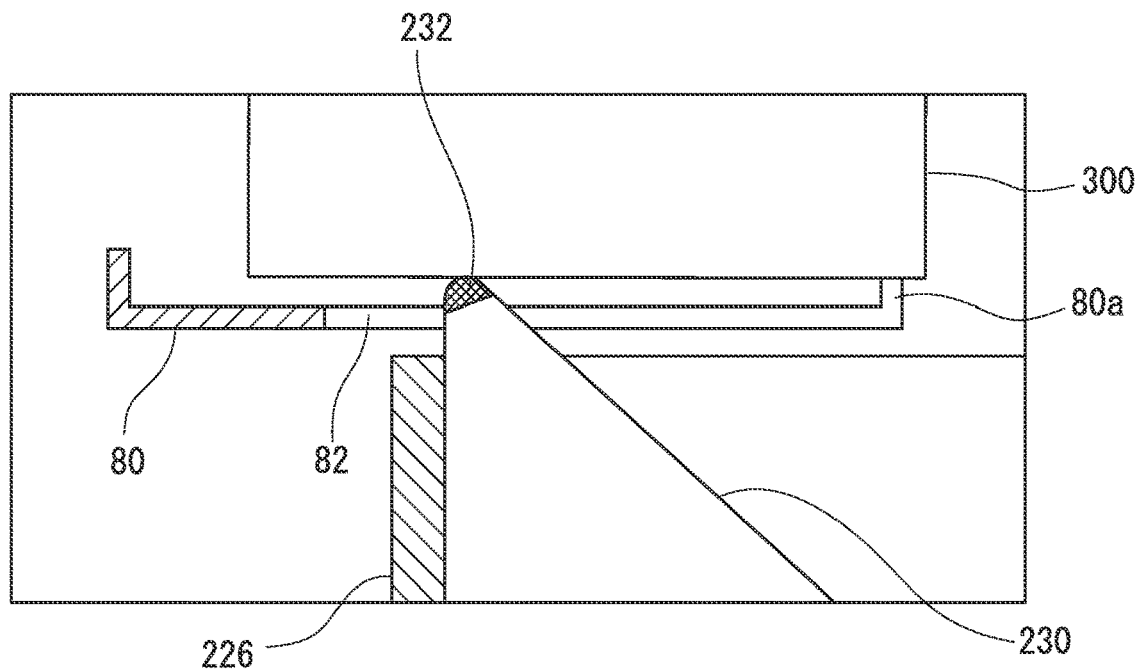
FIG. 20A is a view illustrating a state S42 in more detail.
Figure 20B:
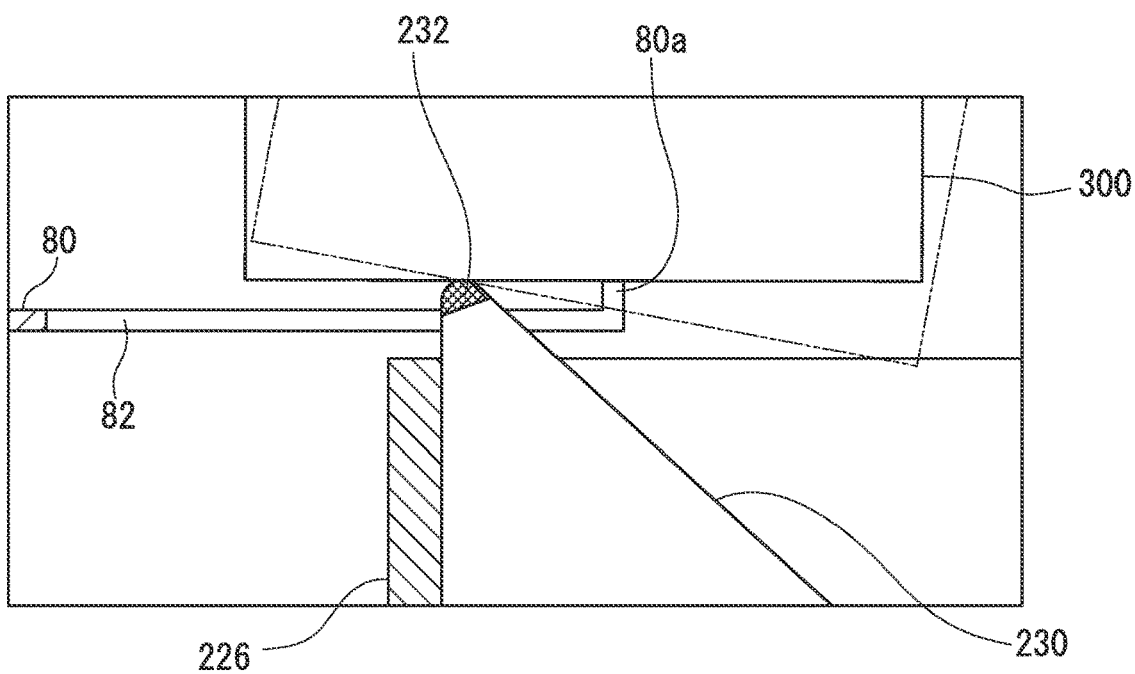
FIG. 20B is a view illustrating the state S42 in more detail.

Next, processing of delivering the cargo 300 from the stacker 50 to the UGV 220 will be described with reference to FIGS. 19, 20A, and 20B. FIG. 19 is a view illustrating a flow of delivery of the cargo 300, and FIGS. 20A and 20B are views illustrating a state S42 in more detail. In FIGS. 19 and 20, the left-and-right direction on the paper surface is the expanding-and-contracting direction of the hand 58 and the forward-and-rearward direction of the UGV 220.

When the cargo 300 is delivered to the UGV 220, the UGV 220 moves to a predetermined position in the vehicle and then opens the lid body 228, as illustrated in the state S40. Meanwhile, the controller 130 allows the hand 58 to be rotated, to be lifted or lowered, and to expand or contract so as to position the fork plate 80 directly above the ramp plate 230. At this time, the UGV 220 adjusts its position so that the contact portion 232 of the ramp plate 230 is positioned immediately below the notch 82 of the fork plate 80 and in the vicinity of the end portion on the retreating direction side of the cargo 300.

Subsequently, as illustrated in the state S42, the controller 130 lowers the hand 58 until the bottom surface of the cargo 300 comes into contact with the contact portion 232 of the ramp plate 230. Here, as described above, the cargo 300 straddles between the central portion 80c of the fork plate 80 and the protrusion 80a. In this state, when the contact point comes into contact with the bottom surface of the cargo 300, the cargo 300 is lifted from the central portion 80c and straddled between the ramp plate 230 and the protrusion 80a of the fork plate 80, as illustrated in FIG. 20A.

In this state, the controller 130 causes the hand 58 to contract. At this time, the cargo 300 is in contact with the contact portion 232 of the ramp plate 230. The frictional force between the contact portion 232 and the cargo 300 is sufficiently higher than the frictional force between the protrusion 80a and the cargo 300. Therefore, when the hand 58 contracts, the cargo 300 does not slide with respect to the ramp plate 230 and tends to stay there. As a result, the fork plate 80 retreats to the proximal end side in the expanding-and-contracting direction while sliding on the bottom surface of the cargo 300. FIG. 20B illustrates a state at this time.

As the contraction of the hand 58 progresses, the contact between the protrusion 80a of the fork plate 80 and the cargo 300 is finally released, as illustrated in a state S44 of FIG. 19, and the cargo 300 is supported only by the contact portion 232 of the ramp plate 230. However, it is difficult to keep the cargo 300 horizontal only with the contact portion 232. Therefore, the cargo 300 falls down toward the ramp plate 230, as shown in the state S44. Thereafter, as shown in a state S46, the cargo 300 falls while sliding on the ramp plate 230 due to gravity, and is housed in the box-shaped main body 226. Finally, when the lid body 228 is closed, the delivery of the cargo 300 to the UGV 220 is completed.

As is apparent from the above description, in the present example, the container 224 of the UGV 220 is provided with the ramp plate 230, and the cargo 300 is slid down along the ramp plate 230, thereby delivering the cargo 300 to the UGV 220. In other words, according to the present example, a complicated mechanism such as a lifter or a hand mechanism is unnecessary on the UGV 220 side. As a result, the configuration of the UGV 220 can be simplified, and the price of the UGV 220 can be kept low.

In the present example, the protrusion 80a is provided at the tip of the fork plate 80. As a result, as illustrated in FIGS. 20A and 20B, the cargo 300 can be lifted almost horizontally by the contact portion 232. Thus, falling of the cargo 300 from the fork plate 80 can be prevented. That is, in a case where the protrusion 80a is not provided, when the cargo 300 is lifted by the contact portion 232, the cargo 300 is inclined rearward and downward with respect to the forward-and-rearward direction of the UGV 220. This inclination angle becomes steeper as the rearward movement of the fork plate 80 progresses and the distance between the tip of the fork plate 80 and the contact portion 232 becomes shorter. A two-dot chain line in FIG. 20B indicates the cargo 300 in a case where the protrusion 80a is not provided. Therefore, in a case where the protrusion 80a is not provided, the inclination of the cargo 300 becomes steep before the fork plate 80 sufficiently retreats, and as such, the cargo 300 may fall from the fork plate 80. In this case, the impact applied to the cargo 300 increases. On the other hand, in a case where the protrusion 80a is provided and the cargo 300 is lifted horizontally by the contact portion 232 as shown in the present example, the horizontal state can be maintained until the fork plate 80 sufficiently retreats. Then, when the protrusion 80a is positioned to the extreme vicinity of the contact portion 232, the cargo 300 inclines toward the ramp plate 230 with the protrusion 80a positioned at the contact portion 232 or the extreme vicinity of the contact portion 232 serving as a fulcrum. In this case, the impact applied to the cargo 300 can be suppressed to be small.

It is noted that the configurations described so far are examples, and other configurations may be changed as long as the configuration includes at least the storage conveyor 12 that circularly conveys the cargo 300 and the stacker 50 fixedly installed in the vehicle and configured to transfer the cargo 300 between the first transfer position Pf and the second transfer position Ps. For example, the specific configurations of the storage conveyor 12 and the stacker 50 may be changed. Therefore, the storage conveyor 12 may be a belt conveyor. In addition, the storage conveyor 12 may have a configuration in which the cargo 300 is not redirected at a right angle. In addition, the stacker 50 may be configured to directly deliver the cargo 300 to the drone 210 without passing through the relay apparatus 100. Furthermore, the configuration of the UGV 220 may also be changed as appropriate. Therefore, the UGV 220 may be provided with a lifter or a hand mechanism, and the cargo 300 may be transferred to or from the stacker 50 using the lifter or the hand mechanism.

Reference Signs List 10 cargo handling system
12 storage conveyor
16 straight unit
18 right angle turn unit
20 lifter
22 conveyance roller
24 conveyor motor
26, 36 belt
30f first conveyance roller
30s second conveyance roller
32f first assist roller
32s second assist roller
34f first conveyor motor
34s second conveyor motor
38 partition wall
40 sliding rail
42 lifting-and-lowering bar
44 label reader
50 stacker
52 base
53 bearing
54 rotary table
54a gear
56f first main column
56s second main column
58 hand
60 rotary motor
62 gear
64 support bracket
66 lifting-and-lowering motor
68l lower pulley
68u upper pulley
70 belt
72 guide rail
74 coupling plate
76 support arm
78 slide nut
80 fork plate
80a protrusion
80c central portion
80s side portion
82 notch
84 intermediate plate
86 proximal end plate
88 hand motor
90f first pulley
90s second pulley
90t third pulley
92f first belt
92s second belt
100 relay apparatus
102 lifting-and-lowering plate
102c central portion
106 fixed guide
108 first frame
110 second frame
120 roof
122 roof opening
130 controller
132 processor
134 memory
150 door opening
210 drone
220 UGV
222 traveling unit
224 container
226 box-shaped main body
228 lid body
230 ramp plate
232 contact portion
300 cargo
Pf first transfer position
Ps second transfer position
Psd drone transfer position
Psv UGV transfer position
Rt conveyance route

The invention claimed is:

1. An in-vehicle cargo handling system comprising:
a storage conveyor configured to convey a cargo along a looped conveyance route;
a stacker fixedly installed in a vehicle and configured to rotate the cargo at least around an axis parallel to a vehicle vertical direction, the stacker transferring the cargo between a first transfer position provided in the middle of the looped conveyance route and a second transfer position separated from the first transfer position in a horizontal direction, wherein the stacker allows the cargo to be transferred to and from the storage conveyor at the first transfer position; and
an unmanned ground vehicle configured to receive the cargo from the stacker at the second transfer position,
wherein the unmanned ground vehicle includes:
a container configured to accommodate the cargo; and
a ramp provided in the container and inclined horizontally and downward, the ramp allowing the cargo to slide into the container,
wherein the stacker includes a hand that includes a fork plate on which the cargo is placed, the fork plate moving in the horizontal direction and having one or more notches formed at a tip thereof, and
wherein, when the cargo is delivered from the stacker to the unmanned ground vehicle, the stacker is configured to cause the one or more notches of the fork plate to be positioned on the ramp in a state where the cargo is placed on the fork plate, then configured to lower the fork plate to bring a top portion of the ramp into contact with a bottom surface of the cargo, and then configured to cause the fork plate to retreat to a retreating side in the horizontal direction, thereby allowing the cargo to slide down along the ramp.

2. The in-vehicle cargo handling system according to claim 1, wherein the stacker includes:
a main column formed to extend in the vehicle vertical direction;
the hand configured to support the cargo and to be able to move the cargo in the horizontal direction;
a lifting-and-lowering mechanism configured to be able to lift and lower the hand along the main column; and
a rotation mechanism configured to be able to rotate the hand together with the main column.

3. The in-vehicle cargo handling system according to claim 2, wherein the stacker further includes a base fixed to a floor surface of the vehicle,
wherein the rotation mechanism includes:
a rotary table attached to the base so as to be rotatable around the axis parallel to the vehicle vertical direction, the rotary table having the main column fixed thereto; and
a rotary motor fixed to a vicinity of the base and configured to rotate the rotary table by being driven, and
wherein the lifting-and-lowering mechanism includes:
a lifting-and-lowering motor disposed inside the base and fixed to the rotary table; and
a belt stretched along the main column and configured to move in a loop as the lifting-and-lowering motor is driven, the belt having the hand attached thereto.

4. The in-vehicle cargo handling system according to claim 1, wherein a frictional force between the top portion of the ramp and the bottom surface of the cargo is higher than a frictional force between the fork plate and the bottom surface of the cargo.

5. The in-vehicle cargo handling system according to claim 1, wherein
the fork plate has a protrusion formed to protrude upward and provided at the tip thereof, and
wherein, when placing the cargo on the fork plate, the stacker causes a part of the cargo to protrude from the tip of the fork plate and places the cargo on the protrusion.

6. The in-vehicle cargo handling system according to claim 1, further comprising:
a roof opening formed on a ceiling of the vehicle and configured to allow the cargo to pass therethrough; and
a relay apparatus configured to transport the cargo received from one of a drone landing on the ceiling and the stacker through the roof opening and to deliver the cargo to the other of the drone and the stacker.

7. A method of delivering a cargo from a stacker fixedly installed in a vehicle to an unmanned ground vehicle entering the vehicle, comprising
providing the stacker including a fork plate on which the cargo is placed, the fork plate moving in a horizontal direction and having one or more notches formed at a tip thereof,
providing the unmanned ground vehicle including:
a container configured to accommodate the cargo; and
a ramp provided in the container and inclined horizontally and downward, the ramp allowing the cargo to slide into the container, and
causing the one or more notches of the fork plate to be positioned on the ramp in a state where the cargo is placed on the fork plate, then lowering the fork plate to bring a top portion of the ramp into contact with a bottom surface of the cargo, and then causing the fork plate to retreat to a retreating side in the horizontal direction, thereby allowing the cargo to slide down along the ramp.

* * * * *